(12) United States Patent
Kinpara et al.

(10) Patent No.: US 6,400,118 B2
(45) Date of Patent: Jun. 4, 2002

(54) MAGNETIC-POLE POSITION DETECTING APPARATUS FOR A SYNCHRONOUS MOTOR

(75) Inventors: Yoshihiko Kinpara; Toshiyuki Kaitani, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/799,691

(22) Filed: Mar. 7, 2001

Related U.S. Application Data

(63) Continuation of application No. PCT/JP99/05112, filed on Sep. 20, 1999.

(51) Int. Cl.$^7$ .................................................. H02P 6/18
(52) U.S. Cl. ...................................... 318/721; 318/254
(58) Field of Search ................................ 318/138, 254, 318/439, 700, 721, 722

(56) References Cited

U.S. PATENT DOCUMENTS

| | | | |
|---|---|---|---|
| 4,876,491 A | 10/1989 | Squires et al. .............. | 318/138 |
| 5,028,852 A | * 7/1991 | Dunfield ..................... | 318/254 |
| 5,117,165 A | 5/1992 | Cassat et al. .............. | 318/254 |
| 5,198,733 A | * 3/1993 | Wright ........................ | 318/254 |
| 5,254,914 A | * 10/1993 | Dunfield et al. ............ | 318/254 |
| 5,280,222 A | * 1/1994 | von der Heide et al. ... | 318/138 |
| 5,608,300 A | 3/1997 | Kawabata et al. | |
| 5,821,713 A | 10/1998 | Holling et al. | |
| 5,854,548 A | 12/1998 | Taga et al. .................. | 318/721 |

FOREIGN PATENT DOCUMENTS

| | | |
|---|---|---|
| JP | 7-177788 | 7/1995 |
| JP | 9-163788 A | 6/1997 |

* cited by examiner

*Primary Examiner*—Bentsu Ro
(74) *Attorney, Agent, or Firm*—Leydig, Voit, & Mayer, Ltd.

(57) ABSTRACT

A magnetic-pole position detecting apparatus for a synchronous motor includes an arithmetic section outputting six voltage vectors having equal amplitudes and equal-interval phases to a circuit section as a voltage vector command. The circuit section applies the voltage vectors to a synchronous motor, outputs a trigger signal to a detection section each time after finishing the application of each voltage vector, and detects each phase. Thereafter, the arithmetic section calculates and outputs magnetic-pole positions at every $60/(2^k)$ degrees (where k is a natural number based on the detection current. Each voltage vector is applied for a time period sufficient for each phase winding to be magnetically saturated in an order so that the phases of each voltage vector either increase monotonically or decrease monotonically. Tn detecting the magnetic-pole positions, the arithmetic section generates an added current value that is a result of an adition of current values for each combination of every 180-degree different phases from among current values that are in phase with the voltage vectors. The arithmetic section specifies magnetic-pole positions based on the added current values.

20 Claims, 29 Drawing Sheets

MAGNETIC-POLE POSITION DETECTING APPARATUS FOR A SYNCHRONOUS MOTOR

This application is a continuation of application Ser. No. PCT/JP99/05112, filed Sep. 20, 1999.

TECHNICAL FIELD

The present invention relates to a magnetic-pole position detecting apparatus for a synchronous motor capable of detecting a magnetic-pole position of a synchronous motor easily, securely and with high precision.

BACKGROUND ART

In order to efficiently control a synchronous motor, it has been a conventional practice to detect magnetic-pole positions of a rotor of the synchronous motor. As a method for detecting a magnetic-pole position of the synchronous motor, there has been a method of directly detecting an electric angle (a magnetic-pole position) of the rotor by using a position detector, like an encoder. However, in order to detect directly a rotation angle of the rotor, it is neccessary to add to the synchronous motor a sensor exclusively used for detecting a magnetic-pole position, like a position detector. This has drawbacks in that the scale of the apparatus becomes large which further leads to unsatisfactory economics of the apparatus.

Therefore, there has been proposed an apparatus that detects a magnetic-pole position of a synchronous motor without using a position detector (reference Japanese Patent Application (Laid-Open) No. 7-177788). FIG. 24 is a diagram showing a schematic configuration of a conventional magnetic-pole position detecting apparatus for a synchronous motor that does not use a position detector. In FIG. 24, a synchronous motor 1 has a permanent-magnet type rotor, and has a three-phase winding of U-phase, V-phase and W-phase. An arithmetic section 102 outputs a voltage vector command V to a circuit section 3, and outputs a trigger signal Tr to a detection section 4. The circuit section 3 applies a voltage to each phase of the synchronous motor 1 based on the input voltage vector command V. The detection section 4 detects a current of each phase at a rise timing of the trigger signal Tr, and outputs a detection current Di to the arithmetic section 102. The arithmetic section 102 calculates a magnetic-pole position θ of the rotor based on the input detection current Di, and outputs a calculated result.

FIG. 25 is a diagram showing a detailed structure of the circuit section 3. In FIG. 25, the circuit section 3 has semiconductor switches 5 to 10. Each pair of semiconductor switches 5 and 8, 6 and 9, and 7 and 10 respectively are connected in series. Each pair of semiconductor switches 5 and 8, 6 and 9, and 7 and 10 respectively are connected in parallel with a DC voltage source 11 that generates a phase potential Ed. An intermediate point Pu for connecting between the semiconductors 5 and 8 is connected to the U-phase of the synchronous motor 1. An intermediate point Pv for connecting between the semiconductors 6 and 9 is connected to the V-phase of the synchronous motor 1. An intermediate point Pw for connecting between the semiconductors 7 and 10 is connected to the W-phase of the synchronous motor 1. Each of the semiconductor switches 5 to 10 has a corresponding one of insulation gate type bipolar transistors (IGBT) Q1 to Q6 and a corresponding one of diodes D1 to D6 connected in parallel. The diodes are directed in sequence to a plus side of the DC voltage source 11. A gate signal to be applied to a gate of each of the IGBTs Q1 to Q6 forms a voltage vector command V, and this voltage vector command V turns off/off corresponding transistors of the IGBTs Q1 to Q6.

The voltage vector V has nine switching modes "0" to "8", and the respective switching modes "0" to "8" are defined as follows based on combinations of the IGBTs Q1 to Q6 to be turned on.

Switching mode: Combination of the IGBTs Q1 to Q6 to be turned on
"0": Nil
"1": Q1, Q5, Q6
"2": Q1, Q2, Q6
"3": Q4, Q2, Q6
"4": Q4, Q2, Q3
"5": Q4, Q5, Q3
"6": Q1, Q5, Q3
"7": Q1, Q2, Q3
"8": Q4, Q5, Q6

Voltage vectors V1 to V8 corresponding to the switching modes "1" to "8" have phase differences of 60 degrees respectively, with equal sizes as shown in FIG. 26. A size of the voltage vector V1 will be obtained here, as one example. As the voltage vector V1 corresponds to the switching mode "1", the IGBTs Q1, Q5 and Q6 are turned on, and the IGBTs Q4, Q2 and Q3 are turned off. Therefore, a line voltage Vuv between the U-phase and the V-phase, a line voltage Vuv between the V-phase and the W-phase, and a line voltage Vwu between the W-phase and the U-phase are given by the following equations (1) to (3) respectively.

$$Vuv = Vu - Vv = Ed \quad (1)$$

$$Vvw = Vv - Vw = 0 \quad (2)$$

$$Vwu = Vw - Vu = -Ed \quad (3)$$

where, "Vu" represents a phase of the U-phase (a potential of the intermediate point Pu), "Vv" represents a phase of the V-phase (a potential of the intermediate point Pv), and "Vw" represents a phase of the W-phase (a potential of the intermediate point Pw).

Further, from the equations (1) to (3), the potentials Vu to Vw are obtained as given by the following equations (4) to (6) respectively.

$$Vu = \tfrac{2}{3} * Ed \quad (4)$$

$$Vv = -\tfrac{1}{3} * Ed \quad (5)$$

$$Vw = -\tfrac{1}{3} * Ed \quad (6)$$

Therefore, a direction of the voltage vector V1 becomes the direction of the U-phase as shown in FIG. 26. Further, a size |V1| of the voltage vector V1 is expressed as given by the following equation (7).

$$|V1| = \tfrac{2}{3} * Ed - \tfrac{1}{3} * Ed \cos(120 \text{ degrees}) - \tfrac{1}{3} * Ed \cos(240 \text{ degrees}) = Ed \quad (7)$$

Directions and sizes of other voltage vectors V2 to V6 can be obtained by carrying out similar calculations to those of the voltage vector V1. As shown in FIG. 26, directions of the voltage vectors V2 to V6 have phase differences of 60 degrees respectively sequentially from the U-phase, and their sizes become Ed. Further, the voltage vector V7 and V8 become voltage vectors having sizes 0 respectively as shown in FIG. 26.

Voltages corresponding to these voltage vectors V1 to V6 are applied to the U-phase, the V-phase and the W-phase of the synchronous motor 1 respectively. In this case, thedetection section 4 detects a current that flows through each phase at the rise timing of the trigger signal Tr. FIG. 27 is a block diagram showing a detailed structure of the detection section 4. In FIG. 27, current detectors 12 to 14 detect currents that flow through the U-phase, the V-phase and the W-phase respectively, and output the detection currents to output processing sections 15 to 17 respectively. The output processing sections 15 to 17 have sample holding circuits 15a to 17a and A/D converters 15b to 17b respectively. The sample holding circuits 15a to 17a hold samples of the current values detected by the current detectors 12 to 14 respectively at the rise timing of the trigger signal Tr input from the arithmetic section 102. The A/D converters 15b to 17b convert analog signals held by the sample holding circuits 15a to 17a into digital signals respectively, and output a current iu of the U-phase, a current iv of the V-phase, and a current iw of the W-phase respectively, which are collectively output as a detection current Di to the arithmetic section 2.

A relationship between the voltage vector command V, the trigger signal Tr and the detection current Di will be explained next with reference to a timing chart shown in FIG. 28. In FIG. 28, the arithmetic section 102 first sequentially outputs voltage vectors V0, V1, V0, V3, V0, V5, and V0 in this order to the circuit section 3 as the voltage vector command V, when the synchronous motor 1 is in the halted state and also when the current of each phase is zero. At the same time, the arithmetic section 102 outputs the trigger signal Tr to the detection section 4 immediately after finishing the application of each voltage vector. As explained above, the circuit section 3 sequentially applies the voltage vectors V0, V1, V0, V3, V0, V5, and V0 in this order to the synchronous motor 1 based on the voltage vector command V. The application time of each of the voltage vectors V1, V3 and V5 is set to a sufficiently short time within a time range in which the synchronous motor 1 is not magnetically saturated. The output processing sections 15 to 17 of the detection section 4 sample the currents of the respective phases, that is, the currents iu, iv and iw, at the rise timing of the trigger signal Tr, and output currents iu1 to iu3 of the U-phase, currents iv1 to iv3 of the V-phase, and currents iw1 to iw3 of the W-phase as detection results respectively to the arithmetic section 102. The current iu1 of the U-phase, the current iv1 of the V-phase and the current iw1 of the W-phase are the currents detected by the trigger signal Tr that is applied immediately after the voltage vector V1. The current iu2 of the U-phase, the current iv2 of the V-phase and the current iw2 of the W-phase are the currents detected by the trigger signal Tr that is applied immediately after the voltage vector V2. The current iu3 of the U-phase, the current iv3 of the V-phase and the current iw3 of the W-phase are the currents detected by the trigger signal Tr that is applied immediately after the voltage vector V3.

The magnetic-pole position θ of the rotor of the synchronous motor 1 and the currents iu1, iv2 and iw3 have a relationship as shown in FIG. 29. Looking at a range of the magnetic-pole positions θ from 0 to 18 degrees, the magnetic-pole positions θ can be divided into six sections at every 30 degrees based on large-and-small relationships of the currents iu1, iv2 and iw3. The six divided regional sections of the magnetic-pole positions θ are expressed as follows with section numbers attached to the respective sections.

| number m | Section | relationship |
|---|---|---|
| 1 | 0 to 30 degrees | iu1 > iw3 > iv2 |
| 2 | 30 to 60 degrees | iw3 > iu1 > iv2 |
| 3 | 60 to 90 degrees | iw3 > iv2 > iu1 |
| 4 | 90 to 120 degrees | iv2 > iw3 > iu1 |
| 5 | 120 to 150 degrees | iv2 > iu1 > iw3 |
| 6 | 150 to 180 degrees | iu1 > iv2 > iw3 |

Therefore, it is possible to obtain the magnetic-pole positions θ at every 30 degrees based on the large-and-small relationships of the currents iu1, iv2 and iw3 when the magnetic-pole positions θ are within the range from 0 to 180 degrees. In order to obtain a specific magnetic-pole position θ, this is calculated from the following equation (8).

$$\theta = (m-1) \times 30 + 15 + f(m) \times (iav - im) \times k \qquad (8)$$

Among the current values of the currents iu1, iv2 and iw3 in each section of the 30 degree unit, any one of the currents iu1, iv2 and iw3 that has an intermediate current value is regarded as a straight line in this section. For example, the current iw3 in the section of the magnetic-pole positions θ from 0 to 30 degrees is regarded as a straight line. A current iav is an average value of the currents iu1, iv2 and iw3. A current im is a current approximated by a straight line in this section number m, and a coefficient k is an inclination of this straight line. When section numbers are 1, 3 and 5, f(m)=1. When section numbers are 2, 4 and 6, f (m)=−1.

A magnetic-pole position θ0 can be specified as one-point magnetic-pole position θ instead of a section within the range from 0 to 18 degrees based on this equation (8). As the magnetic-pole position θ changes in the 180 degree period as shown in FIG. 29, the magnetic-pole position θ is determined uniquely by using magnetic saturation forthe whole angles of 360 degrees.

For example, when the section number m is "1", the magnetic-pole position θ is either in the section of 0 to 30 degrees or in the section of 180 to 210 degrees. Therefore, it is not possible to uniquely specify the magnetic-pole position θ. In this case, the section of the magnetic-pole position θ is selectively determined by applying the voltage vectors V1 and V4 having a long application time for generating a magnetic saturation is applied to the synchronous motor 1 as shown in FIG. 17.

More specifically, when there is no magnetic saturation generated, the absolute values of the currents iu4 and iu5 become equal. However, the magnetic flux generated when the voltage vectors V1 and V4 near the magnetic-pole position have been applied works in a direction to increase the magnetism of the magnetic flux of the rotor of the synchronous motor 1. Thus, when a magnetic saturation is generated, the inductance of the coil of the synchronous motor 1 decreases. Therefore, when a magnetic saturation has been generated, a current when the voltage vector V1 or V4 of a phase near the magnetic-pole position θ has been applied has a larger value than a current when the voltage vector V1 or V4 of a phase 180 degrees different from the phase near the magnetic-pole position θ has been applied.

As a result, when the magnetic-pole position θ is either in the section of 0 to 30 degrees or in the section of 180 to 210 degrees, it is decided that the magnetic-pole position θ is in the region of 0 to 30 degrees, when the size |iu4| of the current iu4 is larger than the size |iu5| of the current iu5. Thus, the magnetic-pole position θ obtained from the equation (8) is output directly. When the size |iu4| of the current iu4 is smaller than the size |iu5| of the current iu5, it is decided that the magnetic-pole position θ is in the section of 180 to 210 degrees. In this case, 180 degrees is added to the magnetic-pole position θ obtained from the equation (8), and the result is output.

Similarly, when the section numbers m are "2" to "6", the magnetic-pole positions θ in the range of 0 to 180 degrees are obtained based on the equation (8). Thereafter, the voltage vectors corresponding to the section numbers are applied with a long application time for generating a magnetic saturation. Then, a relationship of the magnetic-pole positions of 180 degrees is decided using a large-and-small relationship of the absolute values of the voltage vectors. Thus, the magnetic-pole positions θ are uniquely specified over the whole angles.

However, according to the above-described conventional magnetic-pole position detecting apparatus for a synchronous motor, as the magnetic-pole position θ is first obtained within a large range of 180 degrees, it has been necessary to apply a voltage vector having an application time not sufficient for generating a magnetic saturation in the coil of the synchronous motor 1. As the currents iu1, iv2 and iw3 that are detected by the application of the voltage vector having an application time not sufficient for generating a magnetic saturation have small amplitudes, the signals of the currents iu1, iv2 and iw3 are easily affected by noise. Therefore, there is a potential that an erroneous amplitude is output. Further, there is a potential that a cancellation occurs when the A/D converters 15b to 17b convert analog signals into digital signals. Therefore, there is a case where it is not possible to detect the currents iu1, iv2 and iw3 in high precision. As a result, there has been a problem in that it is not possible to detect correctly the magnetic-pole positions θ.

Further, according to the above-described conventional magnetic-pole position detecting apparatus for a synchronous motor, as the magnetic-pole positions θ are specified uniquely within the range from 0 to 360 degrees by using a magnetic saturation, two kinds of voltage vectors having an application time for generating a magnetic saturation have been applied. However, in this case, the influence of hysteresis characteristic of a coil is not taken into consideration. Actual amplitude of the detection current is influenced by the hysteresis characteristic of a coil of the synchronous motor, and is also dependent on the sequence of applying the voltage vectors. For example, in the case of the size |iu4| of the current iu4 and the size |iu5| of the current iu5, the size |iu5| becomes smaller than the size |iu4| because of the influence of a nonlinear characteristic of the hysteresis characteristic. Therefore, making a decision of ranges with 180-degree different phases and uniquely specifying magnetic-pole positions θ based on a simple comparison between the size |iu4| and the size |iu5| has had a problem in that there occurs an erroneous detection of the magnetic-pole positions θ.

Therefore, it is an object of the present invention to provide a magnetic-pole position detecting apparatus for a synchronous motor capable of detecting a magnetic-pole position of the synchronous motor easily, securely and in high precision.

DISCLOSURE OF THE INVENTION

In order to achieve the above object, according to a first aspect of the present invention, there is provided a magnetic-pole position detecting apparatus for a synchronous motor comprising: a circuit unit which applies voltage vectors to an n– (where n is a natural number of 3 or above) phase winding of a synchronous motor based on a voltage vector command; a detecting unit which detects currents on the n-phase winding generated by voltage vectors applied from the circuit unit; and an arithmetic unit which outputs the voltage vector command to the circuit unit, applies a trigger signal to the detecting unit immediately after an application of voltage vectors based on the voltage vector command, thereby makes the detecting unit detect currents on the n-phase winding, and calculates magnetic-pole positions of the synchronous motor based on the detection currents, and outputs the result of the calculation, wherein the arithmetic unit outputs to the circuit unit the voltage vector command for applying 2n kinds of voltage vectors with equal amplitudes and equal-interval phases to the n-phase winding over the same time period, and calculates and outputs magnetic-pole positions at every $60/(2^k)$ degrees (where k is a natural number) based on the current values of the phases detected by the detecting unit.

According to the above aspect, the arithmetic unit outputs to the circuit unit the voltage vector command for applying 2n kinds of voltage vectors with equal amplitudes and equal-interval phases to the n-phase winding over the same time period, and calculates and outputs magnetic-pole positions at every $60/(2^k)$ degrees (where k is a natural number) based on the current values of the phases detected by the detecting unit. Therefore, it is possible to detect magnetic-pole positions in the precision of $\pm 60/(2^{(k+1)})$.

Further, according to a second aspect of the invention, there is provided a magnetic-pole position detecting apparatus for a synchronous motor comprising: a circuit unit which applies voltage vectors to an n– (where n is a natural number of 3 or above) phase winding of a synchronous motor based on a voltage vector command; a detecting unit which detects currents on the n-phase winding generated by voltage vectors applied from the circuit unit; and an arithmetic unit which outputs the voltage vector command to the circuit unit, applies a trigger signal to the detecting unit immediately after an application of voltage vectors based on the voltage vector command, thereby makes the detecting unit detect currents on the n-phase winding, and calculates magnetic-pole positions of the synchronous motor based on the detection currents, and outputs the result of the calculation, wherein the arithmetic unit outputs to the circuit unit the voltage vector command for applying 2n kinds of voltage vectors to the n-phase winding over the same time period in the order of either a monotonous increase or a monotonous decrease in the phases of the voltage vectors.

According to the above aspect, the arithmetic unit outputs to the circuit unit the voltage vector command for applying 2n kinds of voltage vectors to the n-phase winding over the same time period in the order of either a monotonous increase or a monotonous decrease in the phases of the voltage vectors. Therefore, it is possible to suppress the influence of nonlinear elements like the hysteresis characteristic of the synchronous motor, and it is also possible to detect magnetic-pole positions in high precision.

Further, according to a third aspect of the invention, there is provided a magnetic-pole position detecting apparatus for a synchronous motor of the above aspect, wherein the arithmetic unit outputs to the circuit unit the voltage vector command for applying the voltage vectors, over a time period sufficient enough for the n-phase winding to be magnetically saturated.

According to the above aspect, the arithmetic unit outputs to the circuit unit the voltage vector command for applying the voltage vectors, over a time period sufficient enough for the n-phase winding to be magnetically saturated. Therefore, it is possible to detect magnetic-pole positions in high precision by detecting a change in the inductance due to a magnetic saturation.

Further, according to a fourth aspect of the invention, there is provided a magnetic-pole position detecting apparatus for a synchronous motor of the above aspect, wherein the arithmetic unit generates an added current value that is a result of an addition of current values for each combination of every 180-degree different phases from among 2n current values that are in phase with the 2n kinds of voltage vectors, and calculates and outputs magnetic-pole positions at every $60/(2^{\wedge}k)$ degrees (where k is a natural number) based on the added current value.

According to the above aspect, the arithmetic unit generates an added current value that is a result of an addition of current values for each combination of every 180-degree different phases from among 2n current values that are in phase with the 2n kinds of voltage vectors, and calculates and outputs magnetic-pole positions at every $60/(2^{\wedge}k)$ degrees (where k is a natural number) based on the added current value. Therefore, it is possible to suppress a change in the inductance due to the saliency of the synchronous motor. As a result, it is possible to detect magnetic-pole positions in high precision.

Further, according to a fifth aspect of the invention, there is provided a magnetic-pole position detecting apparatus for a synchronous motor of the above aspect, wherein the arithmetic unit outputs a magnetic-pole position corresponding to the added current value of which absolute value becomes maximum.

According to the above aspect, the arithmetic unit outputs a magnetic-pole position corresponding to the added current value of which absolute value becomes maximum. Therefore, it is possible to detect magnetic-pole positions easily and correctly.

Further, according to a sixth aspect of the invention, there is provided a magnetic-pole position detecting apparatus for a synchronous motor of the above aspect, wherein the arithmetic unit outputs magnetic-pole positions corresponding to respective signs of the added current values.

According to the above aspect, the arithmetic unit outputs magnetic-pole positions corresponding to respective signs of the added current values. Therefore, it is possible to detect magnetic-pole positions easily and correctly.

Further, according to a seventh aspect of the invention, there is provided a magnetic-pole position detecting apparatus for a synchronous motor of the above aspect, wherein the arithmetic unit generates a first added current value that is a result of an addition of current values for each combination of every 180-degree different phases from among 2n current values that are in phase with the 2n kinds of voltage vectors, generates a second added current value that is a result of an addition of current values for each combination of every 180-degree different phases from among 2n current values that have components orthogonal with the 2n kinds of voltage vectors, and calculates and outputs magnetic-pole positions at every $60/(2^{\wedge}k)$ degrees (where k is a natural number) based on the first and second added current values.

According to the above aspect, the arithmetic unit generates a first added current value that is a result of an addition of current values for each combination of every 180-degree different phases from among 2n current values that are in phase with the 2n kinds of voltage vectors, generates a second added current value that is a result of an addition of current values for each combination of every 180-degree different phases from among 2n current values that have components orthogonal with the 2n kinds of voltage vectors, and calculates and outputs magnetic-pole positions at every $60/(2^{\wedge}k)$ degrees (where k is a natural number) based on the first and second added current values. Therefore, it is possible to suppress the influence of nonlinear elements like a magnetic saturation, and it is also possible to detect a change in the inductance due to the saliency of the synchronous motor. As a result, it is possible to detect magnetic-pole positions in high precision.

Further, according to an eighth aspect of the invention, there is provided a magnetic-pole position detecting apparatus for a synchronous motor of the above aspect, wherein the arithmetic unit generates a first added current value that is a result of an addition of current values for each combination of every 180-degree different phases from among 2n current values that are in phase with the 2n kinds of voltage vectors, generates a second added current value that is a result of an addition of current values for each combination of every 180-degree different phases from among 2n current values that have components in phase with the 2n kinds of voltage vectors, and calculates and outputs magnetic-pole positions at every $60/(2^{\wedge}k)$ degrees (where k is a natural number) based on the first and second added current values.

According to the above aspect, the arithmetic unit generates a first added current value that is a result of an addition of current values for each combination of every 180-degree different phases from among 2n current values that are in phase with the 2n kinds of voltage vectors, generates a second added current value that is a result of an addition of current values for each combination of every 180-degree different phases from among 2n current values that have components in phase with the 2n kinds of voltage vectors, and calculates and outputs magnetic-pole positions at every $60/(2^{\wedge}k)$ degrees (where k is a natural number) based on the first and second added current values. Therefore, it is possible to suppress the influence of nonlinear elements like a magnetic saturation, and it is also possible to detect a change in the inductance due to the saliency of the synchronous motor. As a result, it is possible to detect magnetic-pole positions in high precision.

Further, according to a ninth aspect of the invention, there is provided a magnetic-pole position detecting apparatus for a synchronous motor of the above aspect, wherein the arithmetic unit selects a region of a magnetic-pole position corresponding to the first added current value of which absolute value becomes maximum, and specifies a magnetic-pole position by further narrowing the region of the magnetic-pole position based on a large-and-small relationship that uses the second added current value within the selected region of the magnetic-pole position.

According to the above aspect, the arithmetic unit selects a region of a magnetic-pole position corresponding to the first added current value of which absolute value becomes maximum, and specifies a magnetic-pole position by further narrowing the region of the magnetic-pole position based on a large-and-small relationship that uses the second added current value within the selected region of the magnetic-pole position. Therefore, it is possible to narrow the range of the magnetic-pole position in high precision. As a result, it is possible to detect magnetic-pole positions in high precision.

Further, according to a tenth aspect of the invention, there is provided a magnetic-pole position detecting apparatus for a synchronous motor of the above aspect, wherein the arithmetic unit selects regions of magnetic-pole positions corresponding to respective signs of the first added current value, and specifies a magnetic-pole position by further narrowing each region of the magnetic-pole position based on a large-and-small relationship that uses the second added current value within the selected region of the magnetic-pole position.

According to the above aspect, the arithmetic unit selects regions of magnetic-pole positions corresponding to respective signs of the first added current value, and specifies a magnetic-pole position by further narrowing each region of the magnetic-pole position based on a large-and-small relationship that uses the second added current value within the selected region of the magnetic-pole position. Therefore, it is possible to narrow the range of the magnetic-pole position in high precision. As a result, it is possible to detect magnetic-pole positions in high precision.

Further, according to an eleventh aspect of the invention, there is provided a magnetic-pole position detecting apparatus for a synchronous motor of the above aspect, wherein the arithmetic unit selects a region of a magnetic-pole position corresponding to the first added current value of which absolute value becomes maximum, specifies a magnetic-pole position by further narrowing the region of the magnetic-pole position based on a large-and-small relationship that uses the second added current value within the selected region of the magnetic-pole position, and further specifies a magnetic-pole position by further narrowing the region of the magnetic-pole position based on a new large-and-small relationship that uses the second added current value.

According to the above aspect, the arithmetic unit selects a region of a magnetic-pole position corresponding to the first added current value of which absolute value becomes maximum, specifies a magnetic-pole position by further narrowing the region of the magnetic-pole position based on a large-and-small relationship that uses the second added current value within the selected region of the magnetic-pole position, and further specifies a magnetic-pole position by further narrowing the region of the magnetic-pole position based on a new large-and-small relationship that uses the second added current value. Therefore, it is possible to narrow the range of the magnetic-pole position in high precision. As a result, it is possible to detect magnetic-pole positions in high precision.

Further, according to a twelfth aspect of the invention, there is provided a magnetic-pole position detecting apparatus for a synchronous motor of the above aspect, wherein the arithmetic unit selects regions of magnetic-pole positions corresponding to respective signs of the first added current value, specifies a magnetic-pole position by further narrowing each region of the magnetic-pole position based on a large-and-small relationship that uses the second added current value within the selected region of the magnetic-pole position, and further specifies a magnetic-pole position by further narrowing the region of the magnetic-pole position based on a new large-and-small relationship that uses the second added current value.

According to the above aspect, the arithmetic unit selects regions of magnetic-pole positions corresponding to respective signs of the first added current value, specifies a magnetic-pole position by further narrowing each region of the magnetic-pole position based on a large-and-small relationship that uses the second added current value within the selected region of the magnetic-pole position, and further specifies a magnetic-pole position by further narrowing the region of the magnetic-pole position based on a new large-and-small relationship that uses the second added current value. Therefore, it is possible to narrow the range of the magnetic-pole position in high precision. As a result, it is possible to detect magnetic-pole positions in high precision.

Further, according to a thirteenth aspect of the invention, there is provided a magnetic-pole position detecting apparatus for a synchronous motor of the above aspect, wherein the arithmetic unit generates a functional current value using a functional value that includes the first or second added current value, and specifies a region of the magnetic-pole position by further narrowing the region based on a large-and-small relationship between the functional current value and the first or second added current value.

According to the above aspect, the arithmetic unit generates a functional current value using a functional value that includes the first or second added current value, and specifies a region of the magnetic-pole position by further narrowing the region based on a large-and-small relationship between the functional current value and the first or second added current value. Therefore, it is possible to extremely narrow the range of the magnetic-pole position. As a result, it is possible to detect magnetic-pole positions in higher precision.

Further, according to a fourteenth aspect of the invention, there is provided a magnetic-pole position detecting apparatus for a synchronous motor of the above aspect, wherein the arithmetic unit calculates and outputs a magnetic-pole position by applying to the n-phase winding a voltage vector sufficiently larger than an induced voltage that is generated by rotation of the rotor of the synchronous motor, during the rotation of the rotor.

According to the above aspect, the arithmetic unit calculates and outputs a magnetic-pole position by applying to the n-phase winding a voltage vector sufficiently larger than an induced voltage that is generated by rotation of the rotor of the synchronous motor, during the rotation of the rotor. Therefore, it is possible to detect magnetic-pole positions in high precision even when the synchronous motor is in rotation.

BEST MODE FOR CARRYING OUT THE INVENTION

The present invention will be explained in detail below with reference to the attached drawings.

Figure 1:
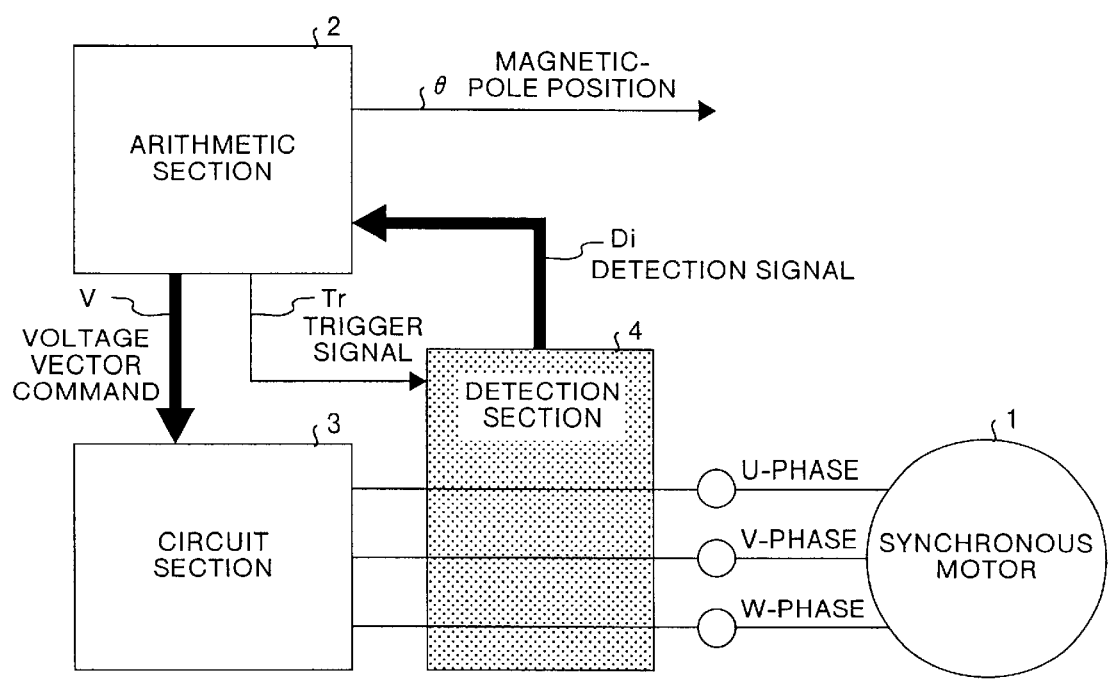
FIG. 1 is a block diagram showing a schematic configuration of a magnetic-pole position detecting apparatus for a synchronous motor in a first embodiment of the present invention.
Figure 24:
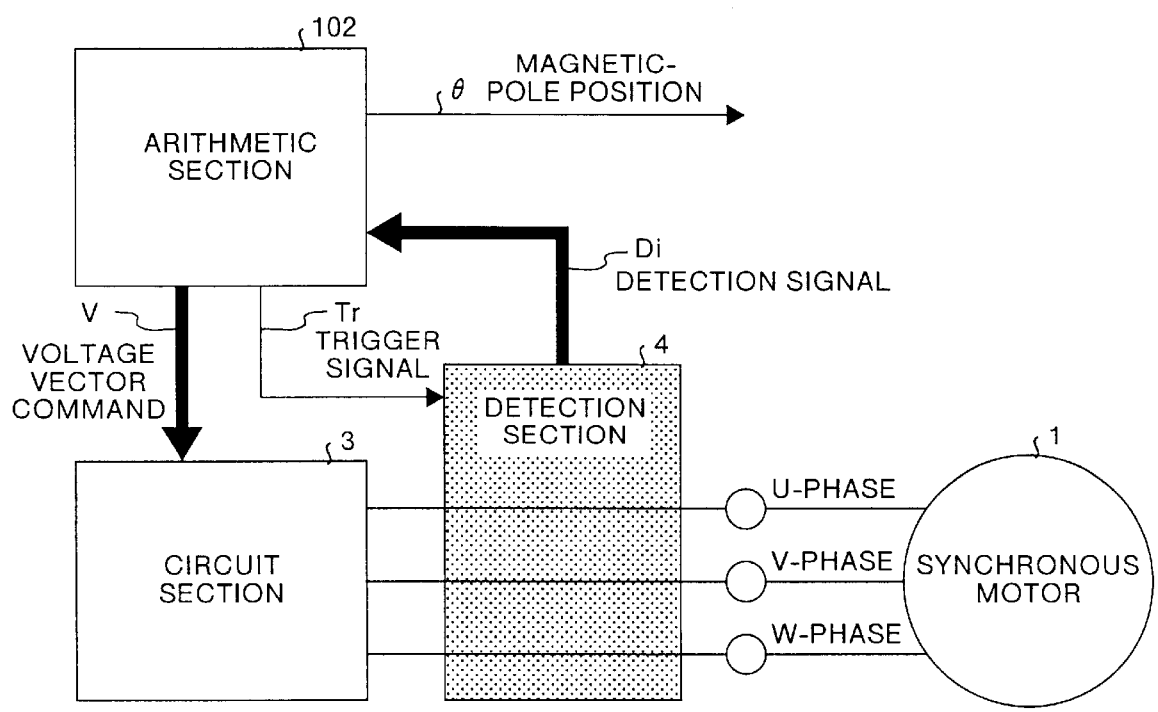
FIG. 24 is a block diagram showing a structure of a conventional magnetic-pole position detecting apparatus for a synchronous motor.
Figure 25:
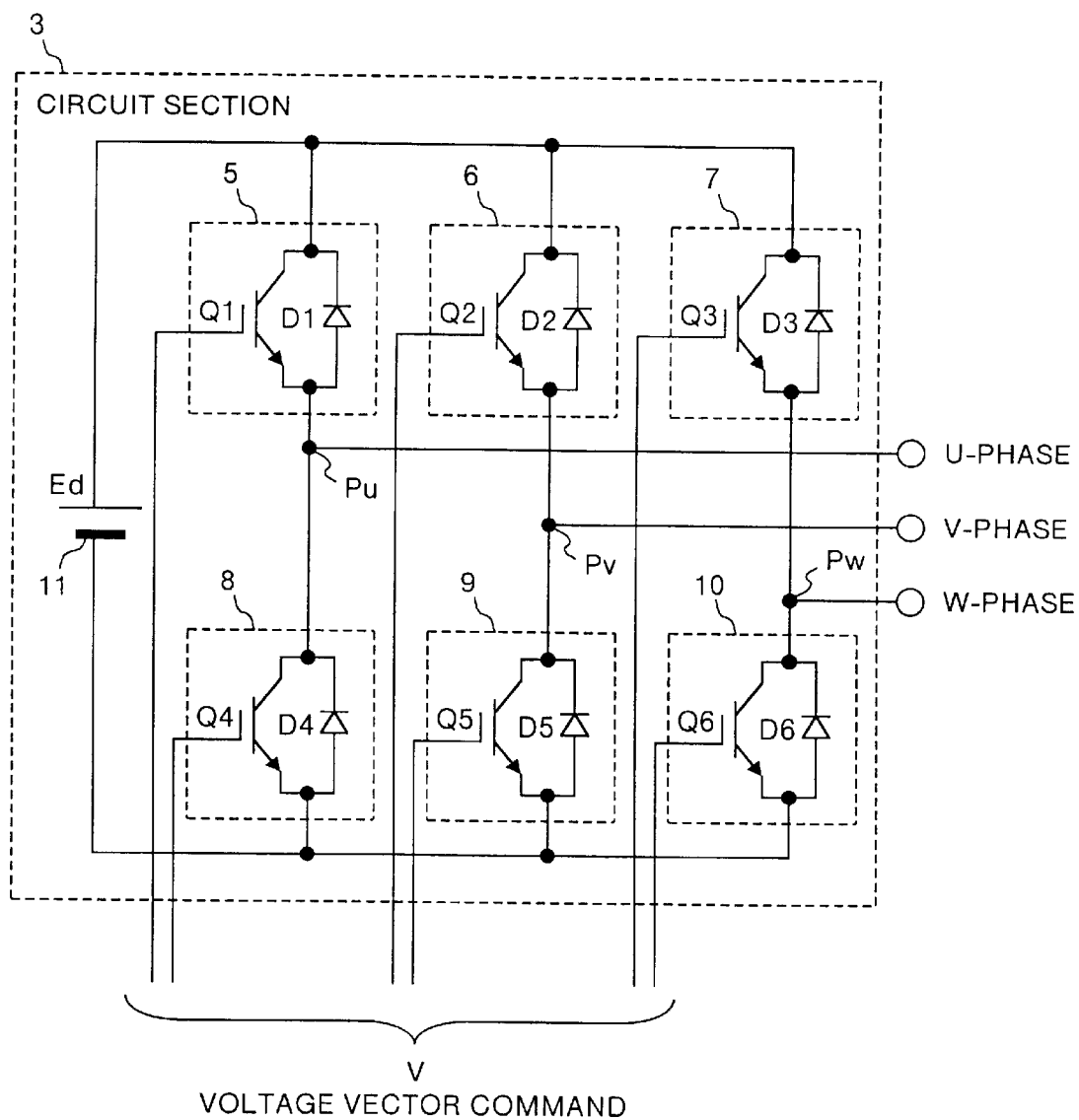
FIG. 25 is a circuit diagram showing a detailed structure of a circuit section 3 shown in FIG. 24.

A first embodiment will be explained first. FIG. 1 is a block diagram showing a schematic configuration of a magnetic-pole position detecting apparatus for a synchronous motor in a first embodiment of the present invention. In FIG. 1, the magnetic-pole position detecting apparatus for a synchronous motor in the first embodiment has an identical structure to that of the conventional magnetic-pole position detecting apparatus for a synchronous motor shown in FIG. 24, except the structure of the arithmetic section 102 in the magnetic-pole position detecting apparatus for the synchronous motor shown in FIG. 24.

A synchronous motor 1 has a permanent-magnet type rotor not shown, and has a three-phase winding of U-phase, V-phase and W-phase. An arithmetic section 2 outputs a voltage vector command V to a circuit section 3, and outputs a trigger signal Tr to a detection section 4. The circuit section 3 applies a voltage to each phase of the synchronous motor 1 based on the input voltage vector command V. The detection section 4 detects a current of each phase at a rise timing of the trigger signal Tr, and outputs a detection current Di to the arithmetic section 2. The arithmetic section 2 calculates a magnetic-pole position θ of the rotor based on the input detection current Di, and outputs a calculated result.

Figure 2:
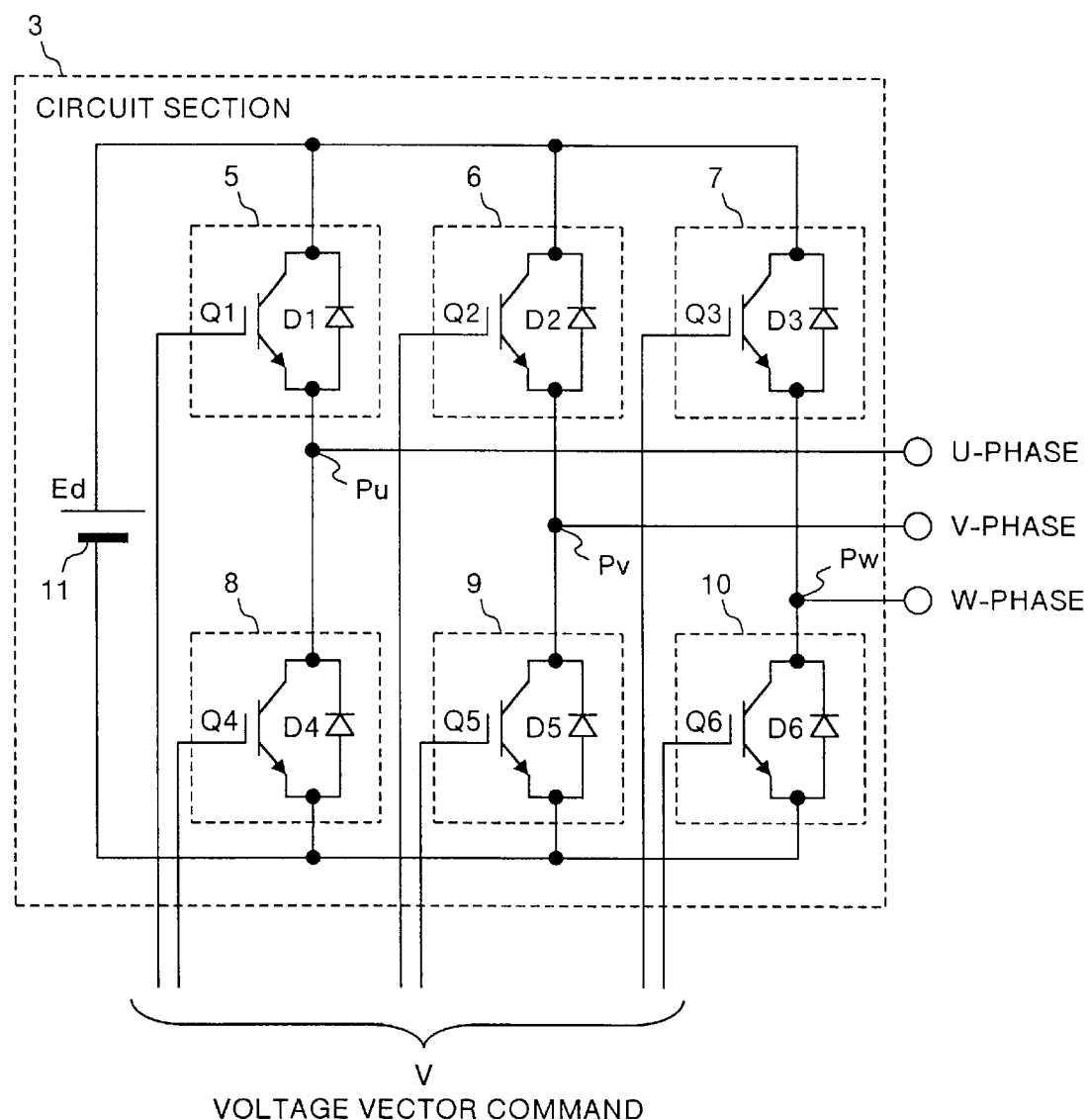
FIG. 2 is a circuit diagram showing a detailed structure of a circuit section 3 shown in FIG. 1.

FIG. 2 is a diagram showing a detailed structure of the circuit section 3. In FIG. 2, the circuit section 3 has semiconductor switches 5 to 10. Each pair of semiconductor switches 5 and 8, 6 and 9, and 7 and 10 respectively are connected in series. Each pair of semiconductor switches 5 and 8, 6 and 9, and 7 and 10 respectively are connected in parallel with a DC voltage source 11 that generates a phase potential Ed. An intermediate point Pu for connecting between the semiconductors 5 and 8 is connected to the U-phase of the synchronous motor 1. An intermediate point Pv for connecting between the semiconductors 6 and 9 is connected to the V-phase of the synchronous motor 1. An intermediate point Pw for connecting between the semiconductors 7 and 10 is connected to the W-phase of the synchronous motor 1. Each of the semiconductor switches 5 to 10 has a corresponding one of IGBT Q1 to Q6 as semiconductor power switching elements and a corresponding one of diodes D1 to D6 connected in parallel. The diodes are directed in sequence to a plus side of the DC voltage source 11. A gate signal to be applied to a gate of each of the IGBTs Q1 to Q6 forms a voltage vector command V, and this voltage vector command V turns off/off corresponding transistors of the IGBTs Q1 to Q6.

Figure 26:
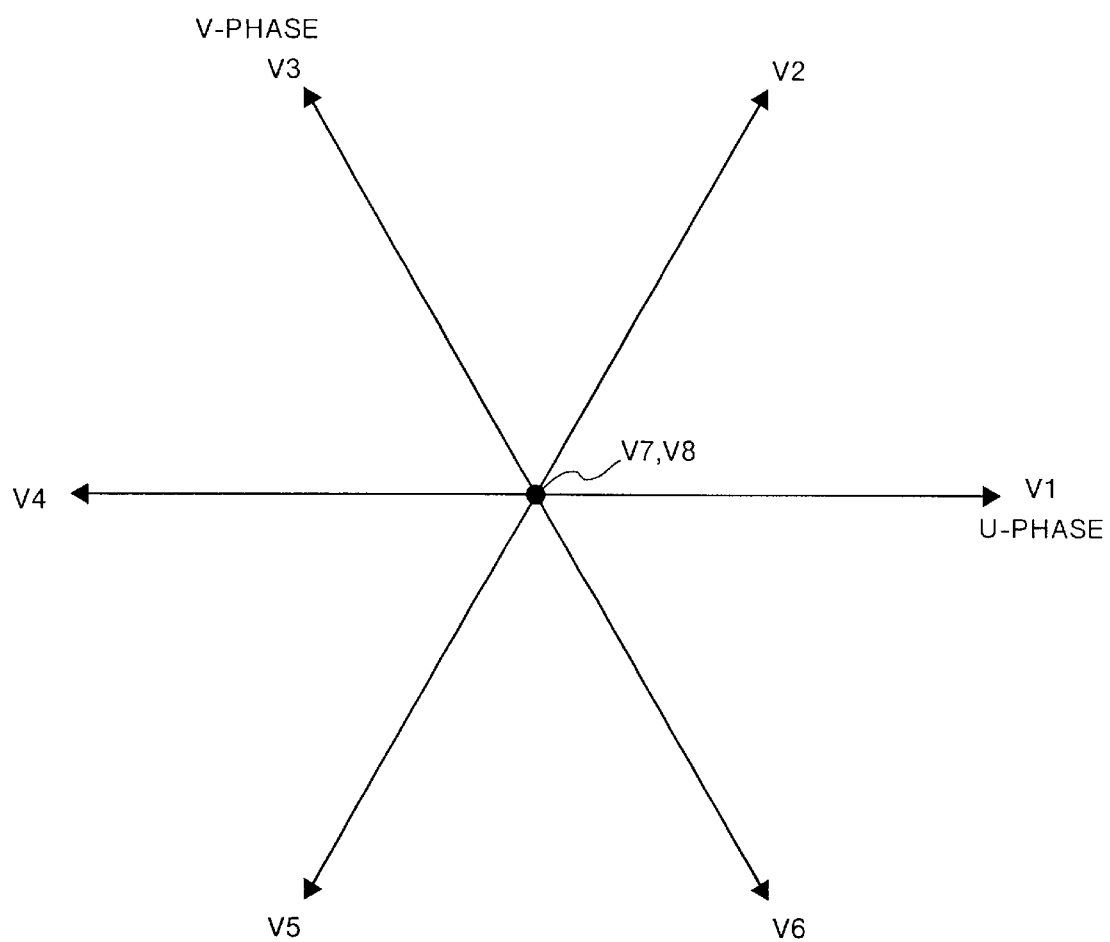
FIG. 26 is a diagram showing a relationship among a U-phase, a V-phase, and a W-phase and voltage vectors V1 to V8.
Figure 27:
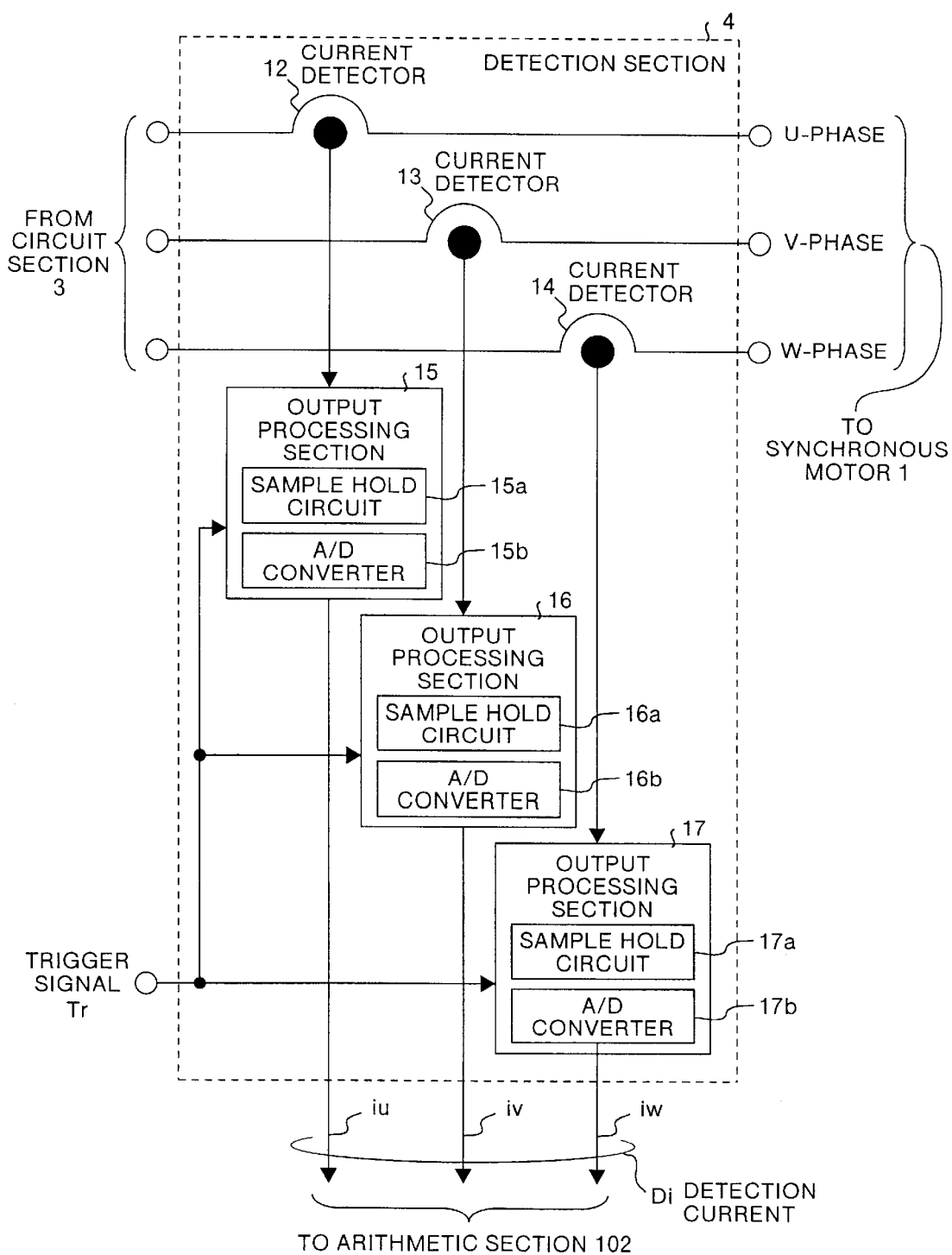
FIG. 27 is a block diagram showing a detailed structure of a detection section 4 shown in FIG. 24.
Figure 28:
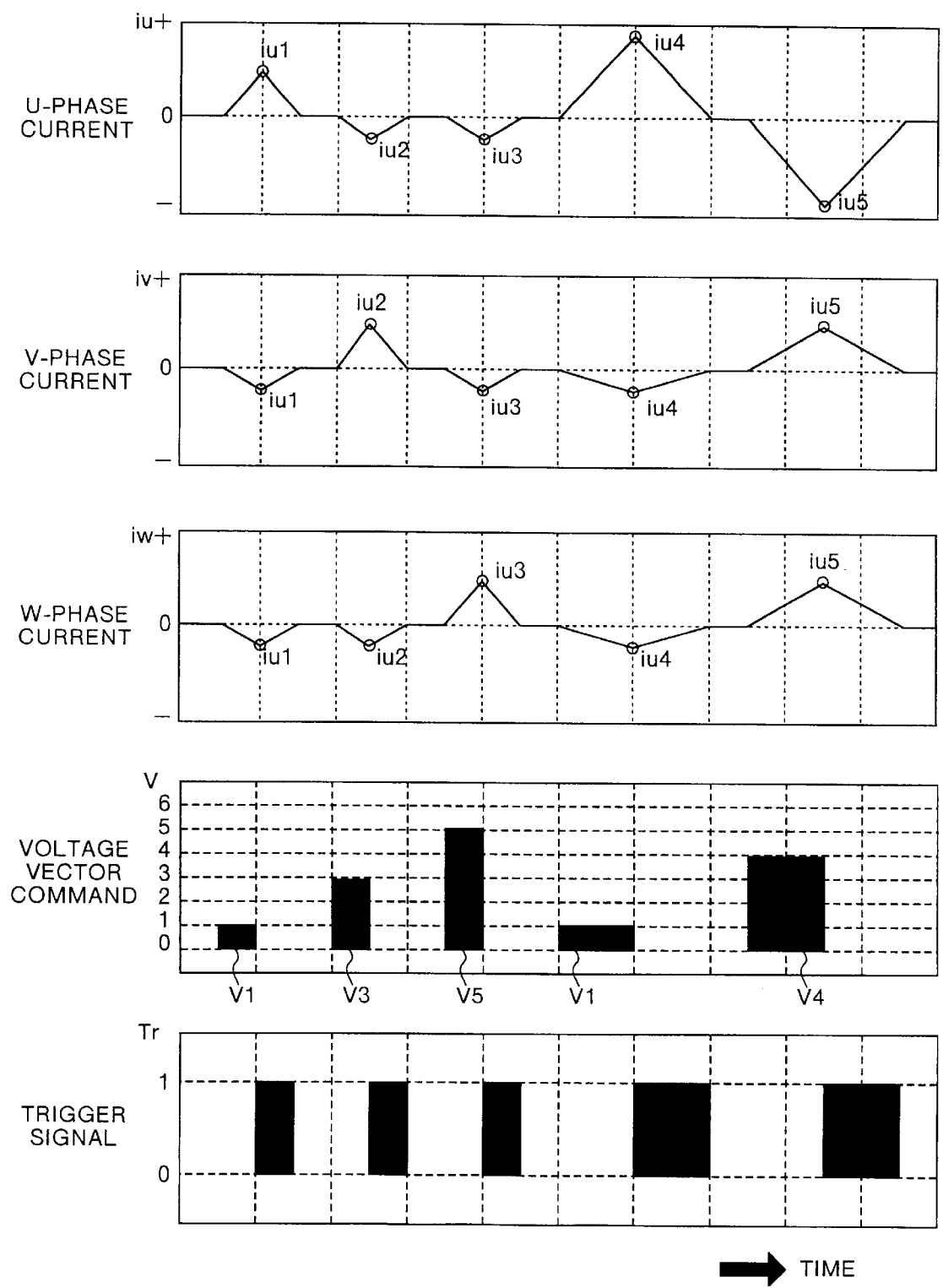
FIG. 28 is a timing chart of a voltage vector command, a trigger signal, and a detection current of each phase in the conventional magnetic-pole position detecting apparatus shown in FIG. 24.
Figure 29:
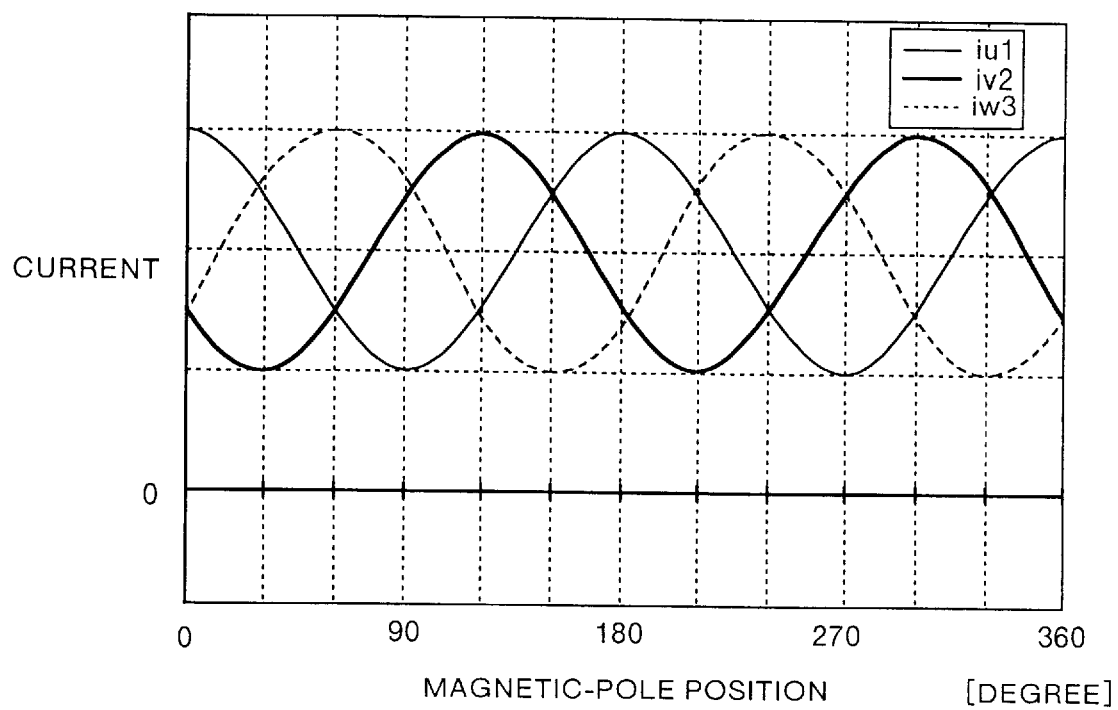
FIG. 29 is a diagram showing changes in currents iu1, iv2, and iw3 at magnetic-pole positions θ.

The voltage vector V has voltage vectors V1 to V8 corresponding to the switching modes "1" to "8" respectively. The voltage vectors V1 to V6 have phase differences of 60 degrees respectively, with equal sizes as shown in FIG. 26. The voltage vectors V7 and V8 are the voltage vectors having zero sizes as shown in FIG. 26. A voltage vector V0 means that all the IGBTs Q1 to Q6 are in the off state.

Figure 3:
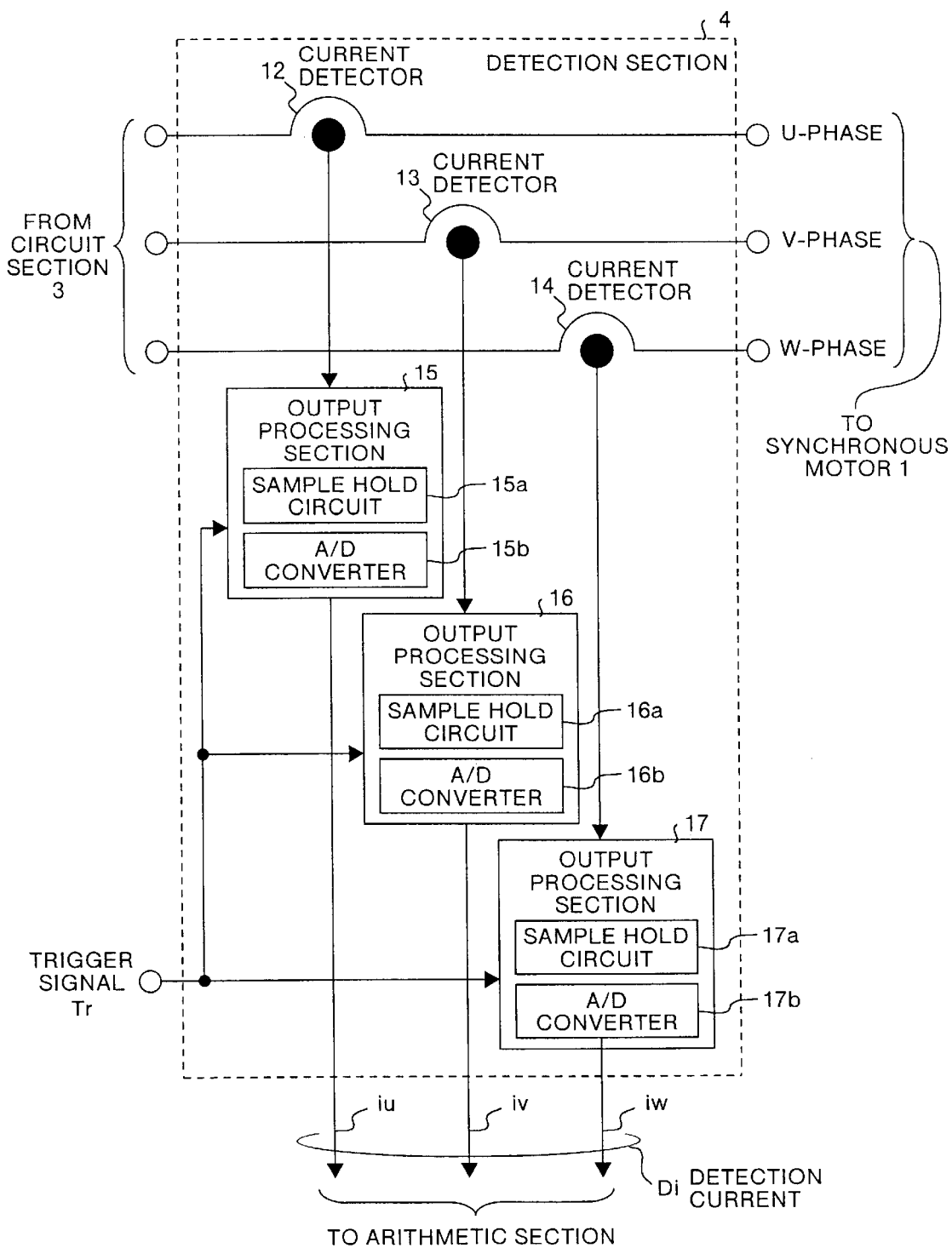
FIG. 3 is a block diagram showing a detailed structure of a detection section 4 shown in FIG. 1.

Voltages corresponding to the voltage vectors V1 to V6 are applied to the U-phase, the V-phase and the W-phase of the synchronous motor 1 respectively. In this case, the detection section 4 detects a current that flows through each phase at the rise timing of the trigger signal Tr. FIG. 3 is a block diagram showing a detailed structure of the detection section 4. In FIG. 3, current detectors 12 to 14 detect currents that flow through the U-phase, the V-phase and the W-phase respectively, and output the detection currents to output processing sections 15 to 17 respectively. The output processing sections 15 to 17 have sample holding circuits 15a to 17a and A/D converters 15b to 17b respectively. The sample holding circuits 15a to 17a hold samples of the current values detected by the current detectors 12 to 14 respectively at the rise timing of the trigger signal Tr input from the arithmetic section 102. The A/D converters 15b to 17b convert analog signals held by the sample holding circuits 15a to 17a into digital signals respectively, and output a current iu of the U-phase, a current iv of the V-phase, and a current iw of the W-phase respectively, which are collectively output as a detection current Di to the arithmetic section 2.

Figure 4:
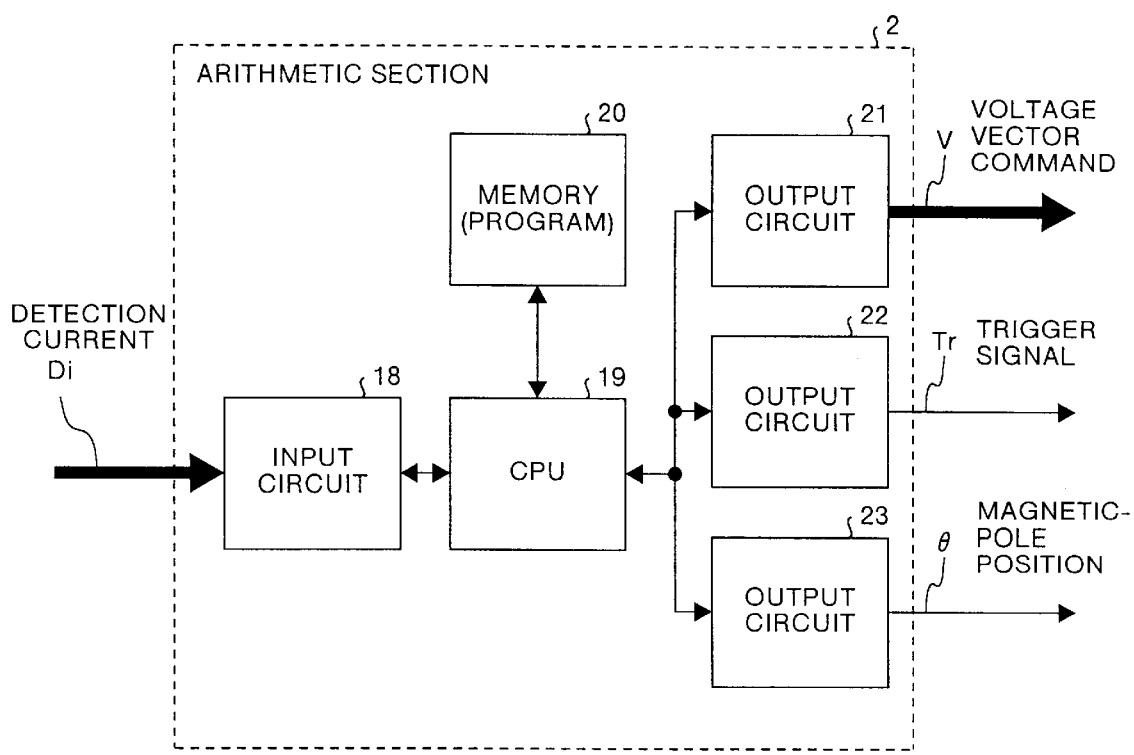
FIG. 4 is a block diagram showing a detailed structure of an arithmetic section 2 shown in FIG. 1.

FIG. 4 is a block diagram showing a detailed structure of the detection section 2. In FIG. 4, a CPU 19 makes the following outputs based on a predetermined program held in a memory 20 respectively. The CPU19 outputs a voltage vectorcommand V to the circuit section 3 via an output circuit 21, and outputs a trigger signal Tr to the detection section 4 via an output circuit 22. When the detection section 4 has input a detection current Di to an input circuit 18, the CPU 19 carries out a processing to be described later based on the detection current Di. The CPU 19 then specifies a magnetic-pole position θ, and outputs the magnetic-pole position θ to the outside via an output circuit 23.

Figure 5:
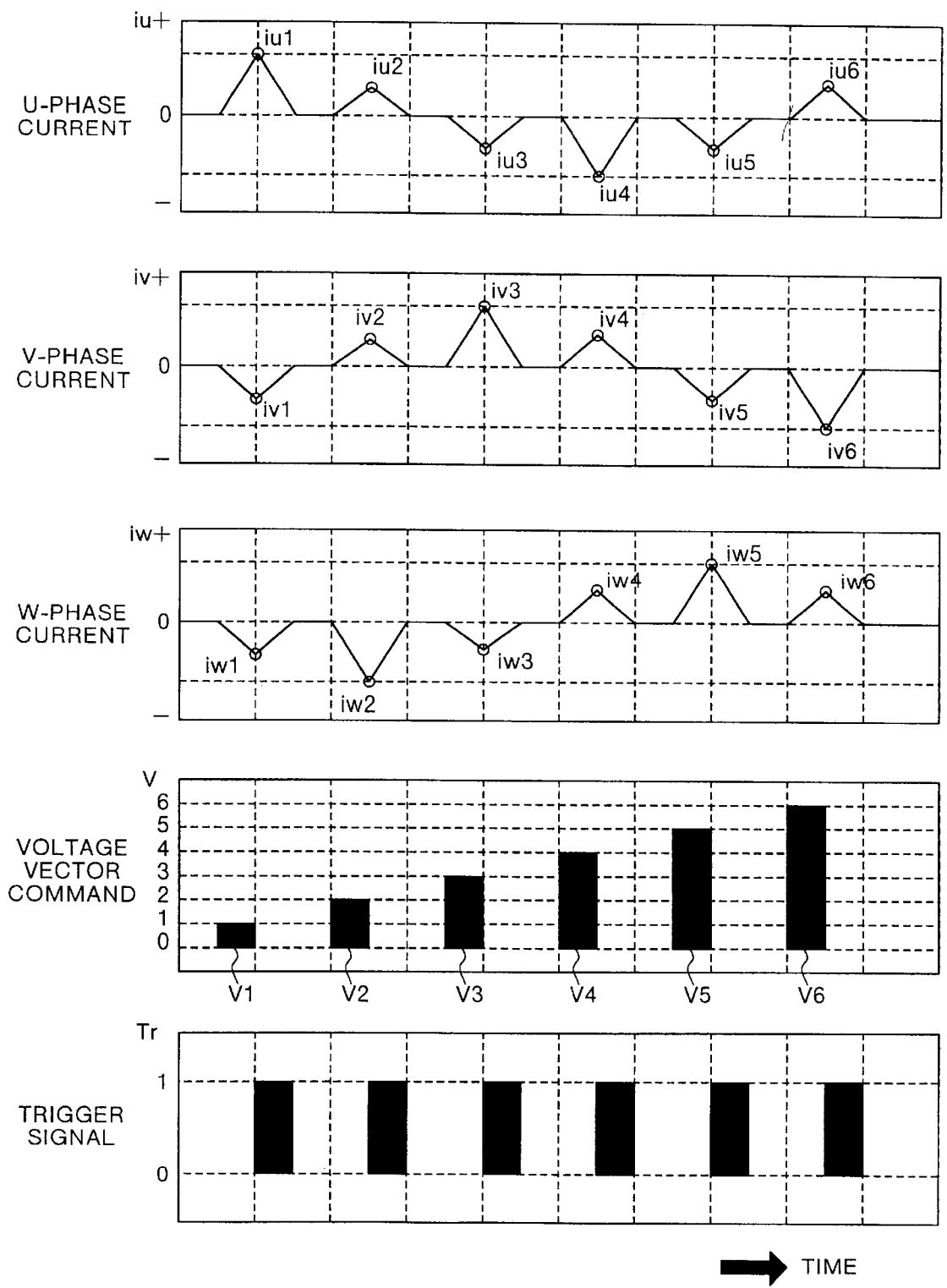
FIG. 5 is a timing chart showing a voltage vector command, a trigger signal, and a detection current of each phase.

FIG. 5 is a timing chart showing a relationship among a voltage vector command V, a trigger signal Tr, and a detection current Di. In FIG. 5, the detection section 2 outputs to the circuit section 3 a voltage vector command V having voltage vectors in the order of V0, V1, V0, V2, V0, V3, V0, V4, V0, V5, V0, V6, and V6. Then, the circuit section 3 sequentially applies voltages corresponding to this voltage vector V, to the synchronous motor 1. The application time of the voltage vector V1 to V6 is sufficient enough for the coil of the synchronous motor 1 to be magnetically saturated. Thus, the coil of the synchronous motor 1 is magnetically saturated by the application of the voltage vectors V1 to V6.

Immediately after finishing the application of the voltage vectors V1 to V6, the arithmetic section 2 outputs trigger signals Tr to the detection section 4. The detection section 4 detects currents iu (iu1 to iu6), iv (iv1 to iv6), and iw (iw1 to iw6) of the respective phases at a rise timing of each trigger signal Tr, and outputs a result to the arithmetic section 2.

A current Δiu that is a sum of the amplitudes of a current Δiu that has been detected when the voltage vector V1 of which phase is equal to the U-phase has been applied, and a current Δiu that has been detected when the voltage vector V4 of which phase is 180 degrees different from that of the voltage vector V1 (reference FIG. 26) has been applied, is defined by the following equation (9). In this case, the voltage vectors V1 to V6 are applied in the order of V1, V2, V3, V4, V5 and V6. Therefore, the current Δiu detected when the voltage vector V1 has been applied is the current iu1, and the current Δiu detected when the voltage vector V4 has been applied is the current iu4. Thus, the current Δiu can be expressed as follows.

$$\Delta iu = iu1 + iu4 \quad (9)$$

When the coil of the synchronous motor 1 is not magnetically saturated, the current iu1 and the current iu4 have equal amplitudes and have different signs (different phases). Therefore, Δiu=0 in this case. However, as theapplication times of the voltage vectors V1 to V6 in the first embodiment are sufficiently long for the coil to be magnetically saturated, the values of Δiu are different depending on the magnetic-pole positions θ of the rotor.

Similarly, current Δiv and current iv that has been detected when the voltage vector V3 of which phase is equal to the V-phase has been applied, and a current iv that has been detected when the voltage vector V6 of which phase is 180 degrees different from that of the voltage vector V3 has been applied, is defined by the following equation (10). Further, a current Δiw that is a sum of the amplitudes of a current Δiw that has been detected when the voltage vector V5 of which phase is equal to the W-phase has been applied, and a current Δiw that has been detected when the voltage vector V2 of which phase is 180 degrees different from that of the voltage vector V5 has been applied, is defined by the following equation (11). When the order of the applications of the above-described voltage vectors V1 to V6 is taken into account, the equations (10) and (11) are given as follows.

$$\Delta iv = iv3 + iv6 \quad (10)$$

$$\Delta iw = iw5 + iw2 \quad (11)$$

Figure 6:
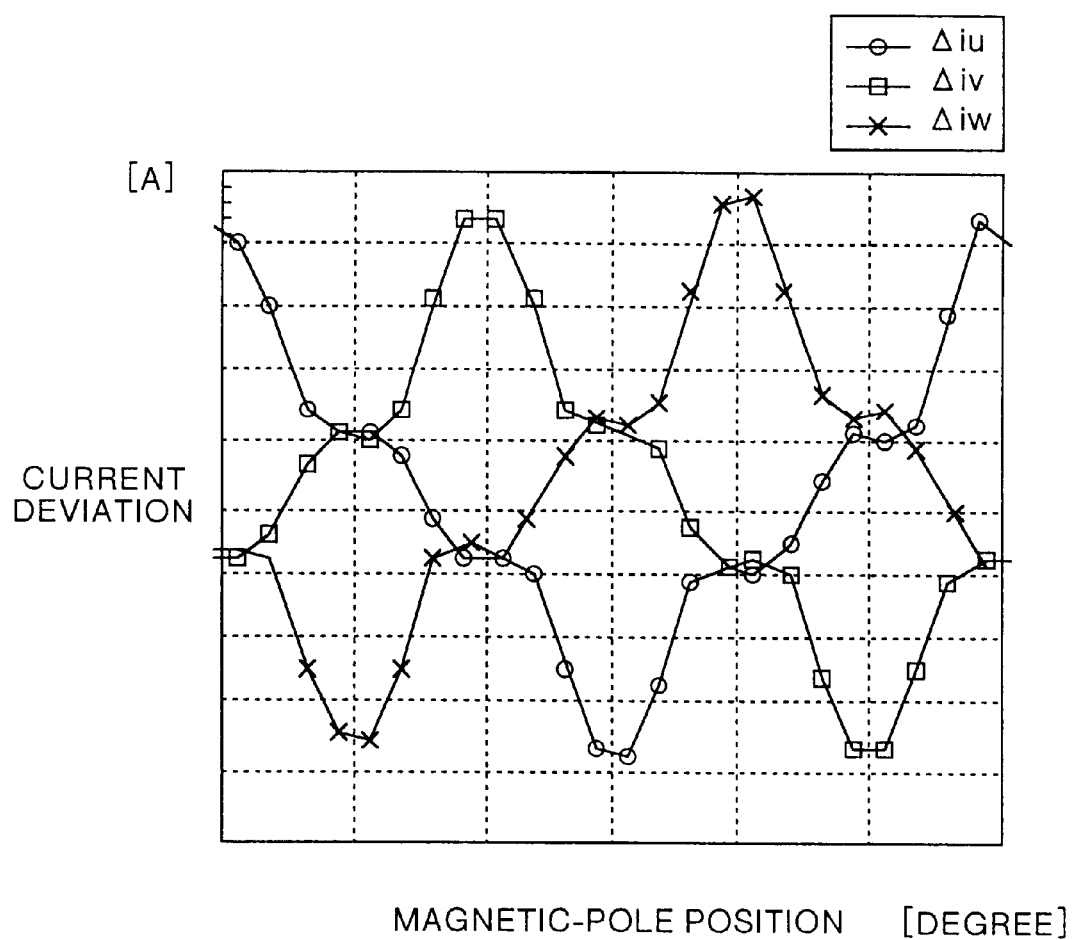
FIG. 6 is a diagram showing changes in currents Δiu, Δiv and Δiw at magnetic-pole positions θ when voltage vectors V1 to V6 are applied in the order of an increase and a decrease in the phases of the voltage vectors V1 to V6.

The above-described iu, iv and iw take different values depending on the magnetic-pole positions θ of the rotor. FIG. 6 is a diagram showing changes in the currents iu, iv and iw at magnetic-pole positions θ when the voltage vectors V1 to V6 are applied in the order of an increase and a decrease in the phases of the voltage vectors V1 to V6. FIG. 6 shows changes in the currents iu, iv and iw when the voltage vectors V1 to V6 are applied such that their phases increase and decrease in the order of V1, V4, V3, V6, V5 and V2.

When only the influence of the magnetic saturation of the coil is taken into account, it is considered that the size (absolute value) of the current iu when the magnetic-pole position θ is zero degree and the size (absolute value) of the current iu when the magnetic-pole position θ is 180 degrees are equal to each other, as the current iu is a sum of the current iu1 in the U-phase detected after the application of the voltage vector V1 and the current iu4 in the U-phase detected after the application of the voltage vector V4.

However, as shown in FIG. 6, in actual practice, the absolute value of a maximum value (a value when the magnetic-pole position θ is zero degree) and the absolute value of a minimum value (a value when the magnetic-pole position 0 is 180 degrees) of the current iu do not coincide with each other due to the nonlinear elements like the hysteresis characteristic of the synchronous motor1. This also applies to the current iv and the current iw.

Figure 7:
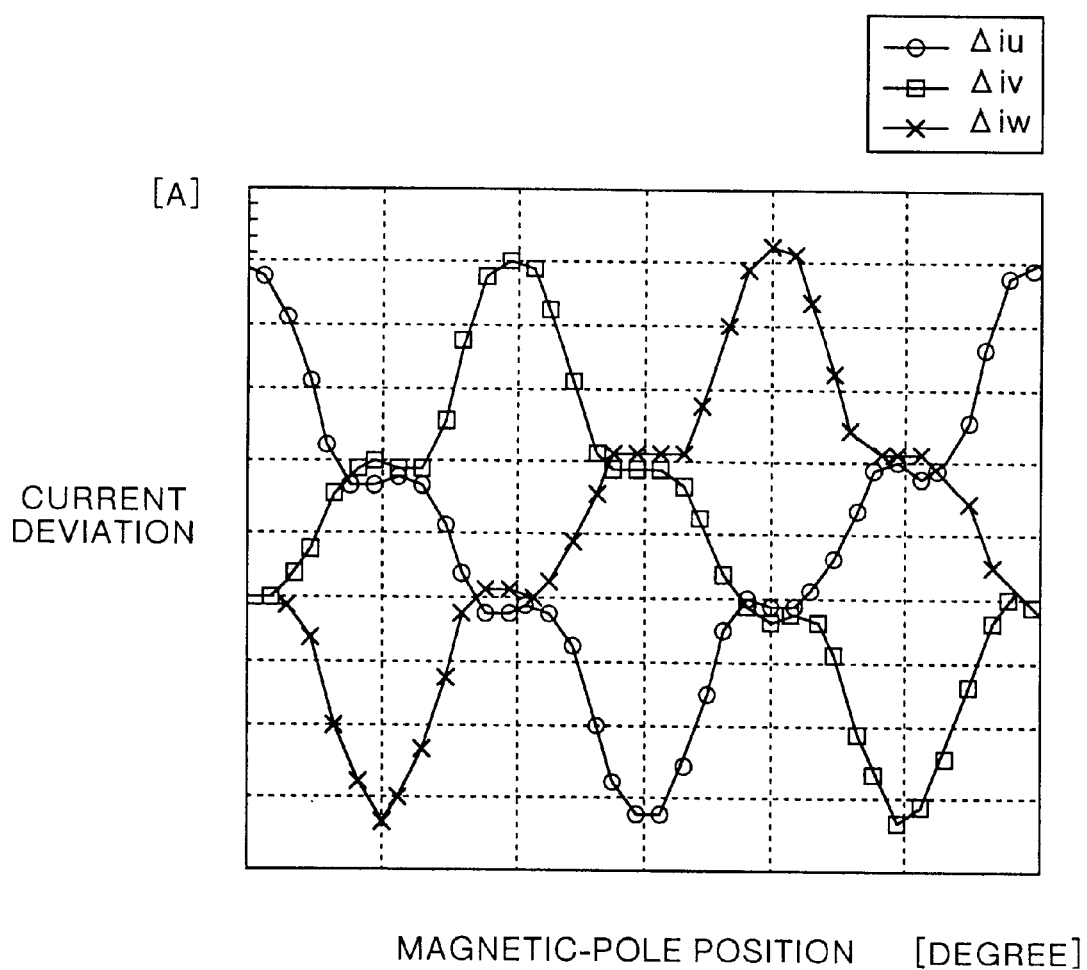
FIG. 7 is a diagram showing changes in currents Δiu, Δiv and Δiw at magnetic-pole positions θ when voltage vectors V1 to V6 are applied in the order of a monotonic increase in the phases of the voltage vectors V1 to V6.

On the other hand, FIG. 7 is a diagram showing changes in the currents iu, iv and iw at magnetic-pole positions θ when the voltage vectors V1 to V6 are applied in the order of a monotonous increase in the phases of the voltage vectors V1 to V6. FIG. 7 shows changes in the currents iu, iv and iw when the voltage vectors V1 to V6 are applied such that their phases increase monotonously in the order of V1, V2, V3, V4, V5 and V6 as shown in FIG. 5.

In this case, by applying the voltage vectors V1 to V6 in the order of a monotonous increase in their phases, it is possible to minimize the influence of the nonlinear elements like the hysteresis characteristic of the synchronous motor 1. As a result, it becomes possible to make respective absolute values of maximum values and minimum values of the amplitude values iu, iv and iw substantially coincide with each other as shown in FIG. 7.

Therefore, in the first embodiment, the voltage vectors V1 to V6 are applied in the order of a monotonous increase in their phases as shown in FIG. 5. Thus, the influence of the nonlinear elements like the hysteresis characteristic of the synchronous motor 1 is avoided. While the voltage vectors V1 to V6 are applied in the order of a monotonous increase in their phases in the present embodiment, it is also possible to make respective absolute values of maximum values and minimum values of the amplitude values iu, iv and iw substantially coincide with each other when the voltage vectors V1 to V6 are applied in the order of a monotonous decrease in their phases, V6, V5, V4, V3, V2 and V1.

After the currents iu, iv and iw shown in the equations (9) to (11) have been calculated, the arithmetic section 2 next calculates values MAX (iu, iv and iw, −iu, −iv and −iw) that are maximum absolute values of the currents iu, iv and iw by using the currents iu, iv and iw. MAX (x1, x2, . . . , xn) mean maximum values of values x1 to xn respectively.

As shown in FIG. 7, the values of the currents iu, iv and iw have a maximum value and a minimum value at every 60 degrees of the magnetic-pole positions θ respectively. For example, when a magnetic-pole position θ is zero, the current iu takes a maximum value, and when a magnetic-pole position θ is 60 degrees, the current iu takes a minimum value. Therefore, when section numbers m that show sections of the magnetic-pole positions θ divided at every 60 degrees are used, a relationship between the section number and the value MAX becomes as follows.

| number m | Section | MAX |
|---|---|---|
| 1 | −30 to 30 degrees | iu |
| 2 | 30 to 90 degrees | −iw |
| 3 | 90 to 150 degrees | iv |
| 4 | 150 to 210 degrees | −iu |
| 5 | 210 to 270 degrees | iw |
| 6 | 270 to 330 degrees | −iv |

6: 270 to 330 degrees: −iv

The reason why the values −iu, −iv and −iw are expressed with the minus signs in the column of the value MAX is as follows. For example, iw expresses a minimum value when the magnetic-pole position θ is 60 degrees. This minimum value is used for calculating it as a maximum value.

A detailed example of the calculation of the value MAX is as follows. When the magnetic-pole position θ is 60 degrees, the value MAX (iu, iv, iw, −iu, −iv, −iw)=−iw. Thus, the section number m=2 is obtained. It can be known that the magnetic-pole position θ in this case is within a range of 30 to 90 degrees.

Specifically, the arithmetic section 2 holds the above-described relationship between the section numbers m and the values MAX in the memory 20, obtains the section number m based on a finally calculated value MAX, and transmits this section number m to the output circuit 23. The output circuit 23 holds a relationship between the section number m and the section or a specific magnetic-pole position θ, and outputs the magnetic-pole position θ corresponding to the input section number m to the outside.

Figure 8:
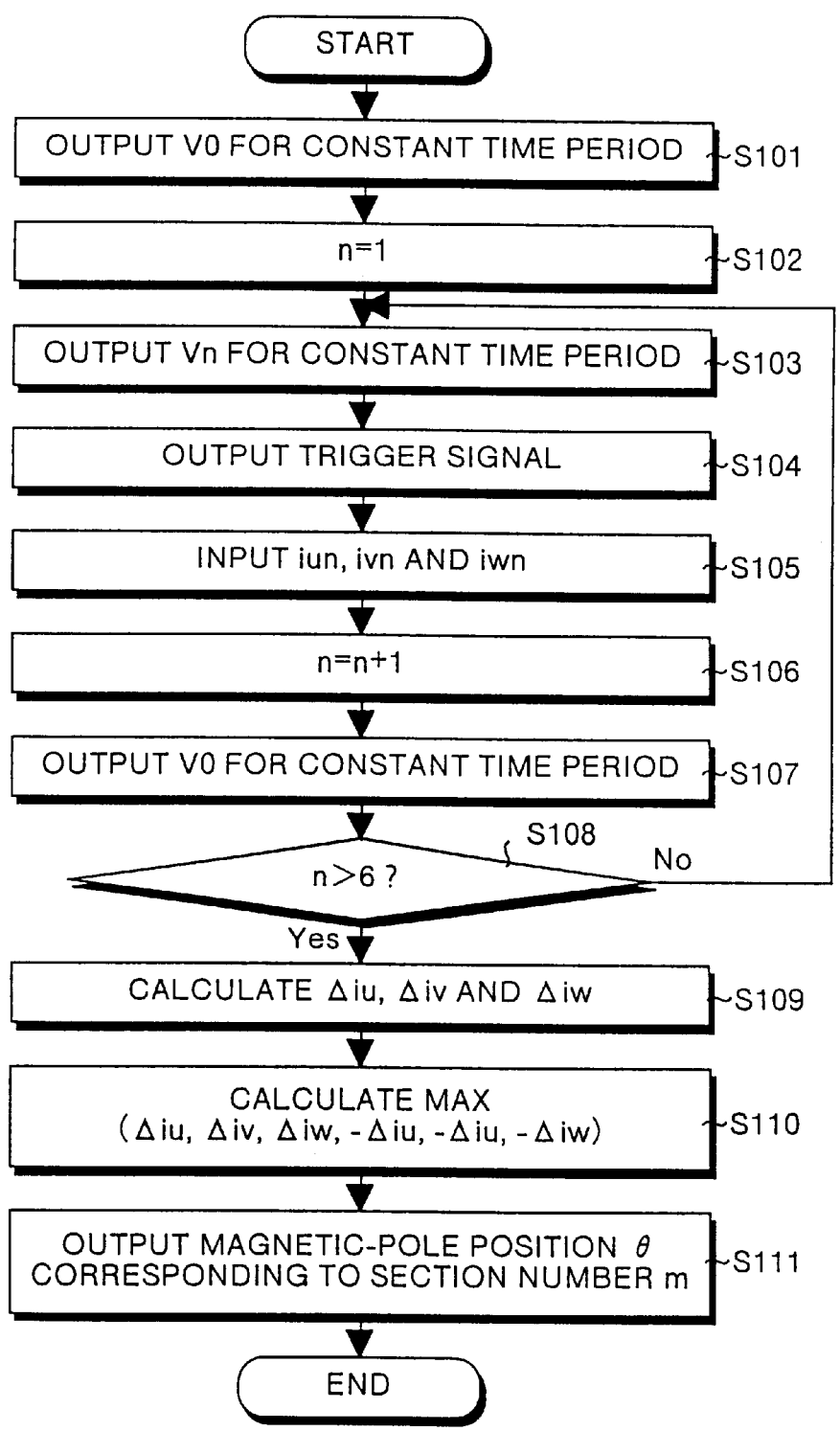
FIG. 8 is a flowchart showing a detection processing procedure of magnetic-pole positions θ by the arithmetic section 2 in the first embodiment.

A method of detecting a magnetic-pole position θ by the arithmetic section 2 in the first embodiment will be explained with reference to a flowchart shown in FIG. 8. Referring to FIG. 8, the arithmetic section 2 first outputs the voltage vector V0 to the circuit section 3 for a constant time period, and applies it to the synchronous motor 1 (step S101). Then, the arithmetic section 2 sets a variable n to "1" (step S102). Based on this set value n, the arithmetic section 2 outputs the voltage vector Vn to the circuit section 3 for a constant time period sufficient enough for the synchronous motor 1 to be magnetically saturated, and applies it to the synchronous motor 1 (step S103). Then, after finishing the application of the voltage vector Vn, the arithmetic section 2 outputs the trigger signal Tr to the detection section 4 (step S104). Then, the arithmetic section 2 obtains the currents iu, iv and iw shown in FIG. 5 from the detection section 4 (step S105). When the variable n is "1", for example, the arithmetic section 2 obtains the currents iu1, iv1 and iw1 that correspond to the voltage vector V1. Then, the arithmetic section 2 increments the variable n by one (step S106), outputs the voltage vector V0 to the circuit section 3 for a constant time period, and applies it to the synchronous motor 1 (step S107). Then, the arithmetic section 2 makes a decision about whether the variable n has exceeded "6" or not (step S108). When the variable n has not exceeded "6" (step S108, NO), the process proceeds to step S103, where the arithmetic section 2 applies the voltage vector Vn with the phase advanced by a further 60 degrees, to the synchronous motor 1. The arithmetic section 2 repeats the processing of obtaining the currents iu, iv and iw.

On the other hand, when the variable n has exceeded "6" (step S108, YES), the arithmetic section 2 calculates the currents iu, iv, iw (step S109). For example, the arithmetic section 2 obtains a sum of the current iu1 when the voltage vector V1 has been applied and the current iu4 when the voltage vector V4 having a phase 180 degrees different from that of the voltage vector V1 has been applied. The arithmetic section 2 then stores this sum in the memory 20 as the current iu. The arithmetic section 2 calculates the values iv and iw in a similar manner, and holds a result in the memory 20. The arithmetic section 2 further calculates the values MAX (iu, iv, iw, −iu, −iv, −iw) (step S110),and outputs the section numbers m corresponding to the obtained values MAX to the output circuit 23. The output circuit 23 outputs the magnetic-pole position θ corresponding to the input section numbers m to the outside (step S111). Thus, this processing is finished.

At step S105 for obtaining the currents iu, iv and iw, there may be obtained only the currents iu1, iw2, iv3, iu4, iw5 and iv6 that are necessary for calculating the currents iu, iv and iw.

In the first embodiment, the magnetic-pole positions θ are output based on the large-and-small relationships of the currents iu, iv and iw. However, it is also possible to output the magnetic-pole positions θ based on the signs of the currents iu, iv and iw.

When the section numbers m and the sections are used, a relationship among them and the signs of the currents iu, iv and iw become as follows.

| number m | Section | iu | iv | iw |
|---|---|---|---|---|
| 1 | −30 to 30 degrees | + | − | − |
| 2 | 30 to 90 degrees | + | + | − |
| 3 | 90 to 150 degrees | − | + | − |
| 4 | 150 to 210 degrees | − | + | + |
| 5 | 210 to 270 degrees | − | − | + |
| 6 | 270 to 330 degrees | + | − | + |

Based on the relationship among the section numbers m, the sections, and the signs of the currents iu, iv and iw, it is possible to determine the values of the section numbers m from the combinations of the signs of the currents iu, iv and iw.

According to the first embodiment, the voltage vectors V1 to V6 that either increase monotonously or decrease monotonously and that have application times sufficient enough for the coil of the synchronous motor 1 to be magnetically saturated are applied to the synchronous motor 1. Therefore, it is possible to correctly detect the magnetic-pole positions θ in the precision of ±30 degrees without receiving the influence of the nonlinear elements like the hysteresis characteristic of the synchronous motor 1.

A second embodiment will be explained next. In the first embodiment, the voltage vectors V1 to V6 that increase monotonously are applied to the synchronous motor 1, and the magnetic-pole positions θ are output at every 60 degrees based on the currents iu, iv and iw of the phases detected. On the other hand, in the second embodiment, the magnetic-pole positions θ are output at every 30 degrees using detection current values of the components that are orthogonal with the voltage vectors V1 to V6.

The structure of the second embodiment is identical to that of the first embodiment, except the structure of the arithmetic section 2 as the arithmetic section 2 in the second embodiment carries out a processing different from that of the first embodiment shown in FIG. 1.

Figure 9:
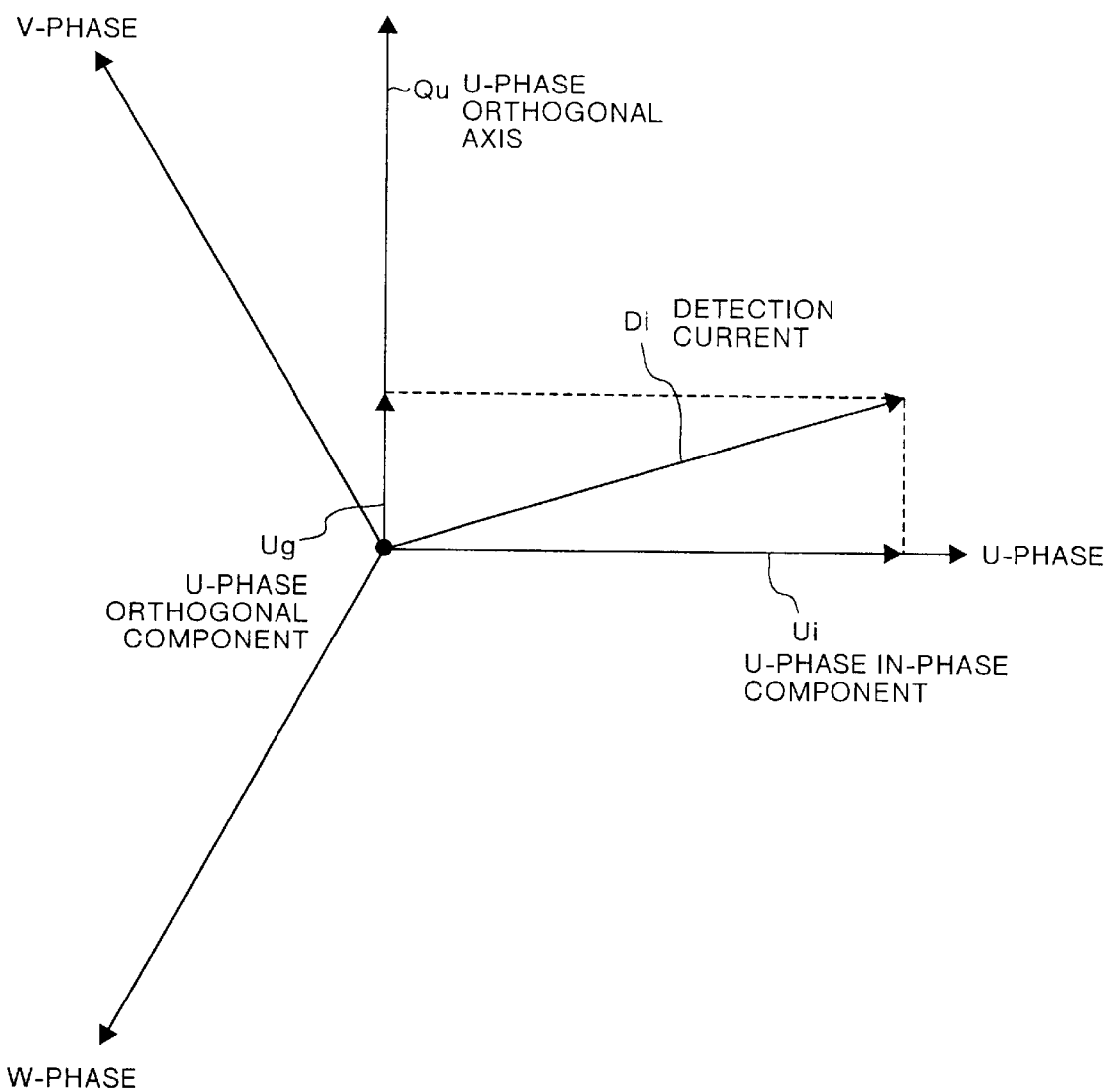
FIG. 9 is a diagram showing a relationship among axes of a U-phase, a V-phase and a W-phase and an axis orthogonal with the axis of the U-phase.

FIG. 9 is a diagram showing a relationship among axes of the U-phase, the V-phase and the W-phase and an axis orthogonal with the axis of the U-phase. In FIG. 9, a detection current Di can be divided into a U-phase in-phase component Ui and a U-phase orthogonal component Uq. This U-phase orthogonal component Uq is proportional to a difference between the current iv of the V-phase and the current iw of the W-phase.

When the voltage vector Vi (U-phase) is applied to the synchronous motor 1, a current iux1 of the U-phase orthogonal component Uq that is orthogonal with the voltage vector V1 can be expressed by the following equation (12) using the current iv1 and the current iw1.

$$iux1 = iv1 - iw1 \quad (12)$$

Similarly, currents iwx2 to ivx6 that are orthogonal with the voltage vectors V2 to V6 when the voltage vectors V2 to V6 are applied to the synchronous motor 1 can be expressed by the following equations (13) to (17) respectively.

$$iwx2 = iu2 - iv2 \quad (13)$$
$$ivx3 = iw3 - iu3 \quad (14)$$
$$iux4 = iv4 - iw4 \quad (15)$$
$$iwx5 = iu5 - iv5 \quad (16)$$
$$ivx6 = iw6 - iu6 \quad (17)$$

When a voltage vector having no magnetic saturation is input to the synchronous motor 1, the current iux1 and the current iux4 change at every 180-degree period at the magnetic-pole positions θ. Therefore, these currents have the same values. On the other hand, when a voltage vector having magnetic saturation is input to the synchronous motor 1, the current iux1 and the current iux4 change at every 360-degree period at the magnetic-pole positions θ, as the currents are interfered at every 360-degree period due to the influence of the magnetic saturation.

In this case, according to the conventional synchronous motor that applies the voltage vector so as not to generate a magnetic saturation, the A/D converters 15b to 17b constrain the resolution in the A/D conversion because of small amplitude of the current detected. As a result, the detection precision is degraded. On the other hand, when it is possible to generate a current sufficient enough to secure the detection precision without constraining the resolution in the A/D conversion, the size of the current iux1 and the size of the current iux4 detected do not coincide with each other due to the influence of the magnetic saturation.

Therefore, in order to eliminate the influence of the magnetic saturation, a current iux that is a sum of the current iux1 and the current iux4 and that is proportional to the average value of the current iux1 and the current iux4 is defined by the equation (18) as follows.

$$iux = iux1 + iux4 \quad (18)$$

When it is taken into consideration that the currents change at every 360-degree period by the influence of the magnetic saturation and that the currents change at every 180-degree period due to the change in the inductance of the coil as described above, the current iux is not influenced by the magnetic saturation of the 360-degree period.

In a similar manner to that of the current iux, it is also possible to define a current ivx as a sum of the current ivx3 and the current ivx6 and a current iwx as a sum of the current iwx2 and the current iwx5 as given by the following equations (19) and (20) respectively.

$$ivx = ivx3 + ivx6 \quad (19)$$
$$iwx = iwx2 + iwx5 \quad (20)$$

Figure 10:
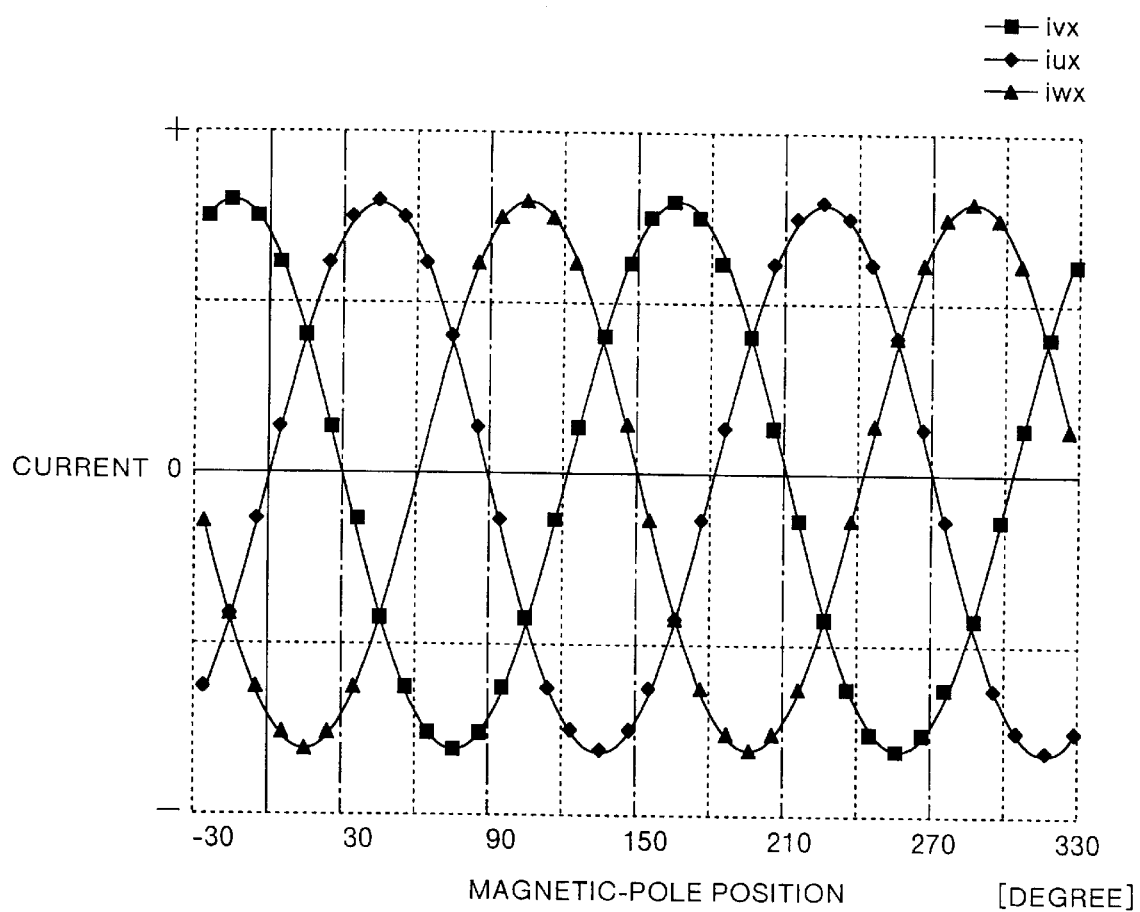
FIG. 10 is a diagram showing a relationship among currents iux, ivx, and iwx and magnetic-pole positions θ.

The currents iux, ivx and iwx obtained in this way and the magnetic-pole positions θ have a relationship as shown in FIG. 10. In FIG. 10, the currents iux, ivx and iwx change at every 180-degree period without the influence of the magnetic saturation. Consider the currents iux, ivx and iwx at the magnetic-pole positions θ that change at every 30 degrees. When the magnetic-pole position θ is between −30 and zero degrees out of the range from −30 to 30 degrees, for example, there is a relationship of 2*iux<ivx+iwx. On the other hand, when the magnetic-pole position θ is between zero and 30 degrees out of the range from −30 to 30 degrees, there is a relationship of 2* iux>ivx+iwx. Similarly, it can be understood that in the case of other magnetic-pole positions θ that change at every 60 degrees, the large-and-small relationships are inverted for the magnetic-pole positions θ that are in the two 30-degree ranges, each being a half of this 60-degree range.

In other words, when the section numbers of sections for the magnetic-pole positions θ that change at every 30 degrees are defined as section number m1, there are following relationships.

| number m1 | Section | relationship |
|---|---|---|
| 1a | −30 to 0 degrees | 2*iux < ivx + iwx |
| 1b | 0 to 30 degrees | 2*iux > ivx + iwx |
| 2a | 30 to 60 degrees | 2*iwx < iux + ivx |
| 2b | 60 to 90 degrees | 2*iwx > iux + iwx |
| 3a | 90 to 120 degrees | 2*ivx < iux + iwx |
| 3b | 120 to 150 degrees | 2*ivx > iux + iwx |
| 4a | 150 to 180 degrees | 2*iux < ivx + iwx |
| 4b | 180 to 210 degrees | 2*iux > ivx + iwx |
| 5a | 210 to 240 degrees | 2*iwx < iux + ivx |
| 5b | 240 to 270 degrees | 2*iwx > iux + ivx |
| 6a | 270 to 300 degrees | 2*ivx < iux + iwx |
| 6b | 300 to 330 degrees | 2*ivx > iux + iwx |

Figure 11:
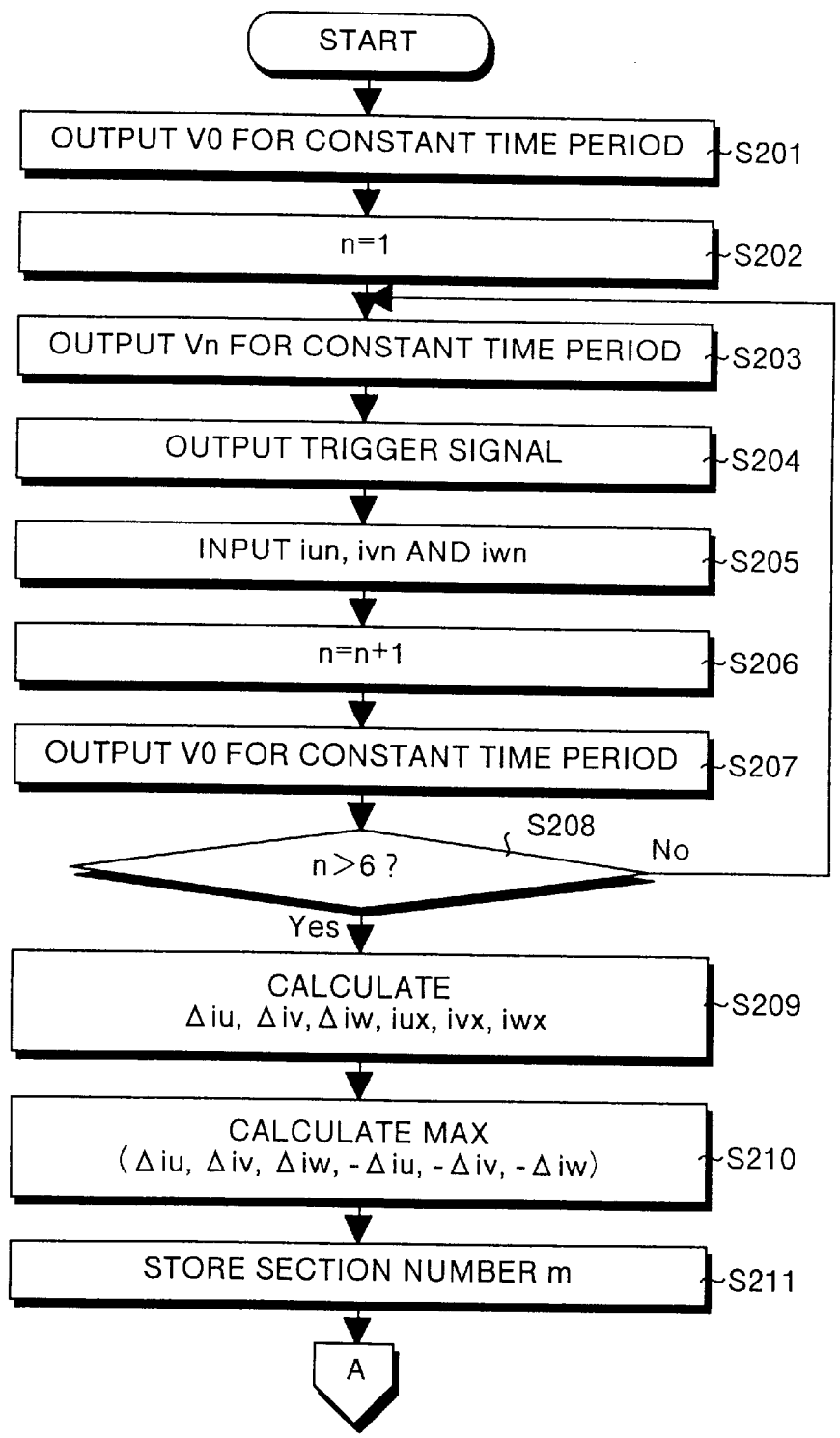
FIG. 11 is a flowchart (part 1) showing a detection processing procedure of magnetic-pole positions θ by an arithmetic section 2 in a second embodiment of the present invention.

A method of detecting a magnetic-pole position θ by the arithmetic section 2 in the second embodiment will be explained with reference to a flowchart shown in FIG. 11 and FIG. 12. Referring to FIG. 11, the arithmetic section 2 first applies the voltage vectors V0, V1, V0, V2, V0, V3, V0, V4, V0, V6 and V0 in this order to the synchronous motor 1 via the circuit section 3 for a constant time period sufficient enough for the synchronous motor 1 to be magnetically saturated at steps S201 to S208, in a similar manner to that at steps S101 to S108 in the first embodiment. Thus, the arithmetic section 2 carries out a processing to obtain at least the currents iu1, iw2, iv3, iu4, iw5 and iv6.

Thereafter, when the variable n has exceeded "6" (step S208, YES), the arithmetic section 2 calculates the currentsiu, iv, iw, iux, ivx and iwx (step S209). For example, the arithmetic section 2 obtains a sum of the current iu1 when the voltage vector V1 has been applied and the current iu4 when the voltage vector V4 having a phase 180 degrees different from that of the voltage vector V1 has been applied. The arithmetic section 2 then stores this sum in the memory 20 as the current iu. The arithmetic section 2 calculates the values iv and iw in a similar manner, and holds a result in the memory 20. The arithmetic section 2 further calculates the currents iux, iwx2, ivx3, iux4, iwx5 and ivx6 of the components orthogonal with the voltage vectors V1 to V6, and calculates the currents iux, ivx and iwx that are the amplitude sums of the currents of which phases are different by 180 degrees among these currents.

The arithmetic section 2 further calculates the values MAX (iu, iv, iw, −iu, −iv, −iw) (step S210), and holds the section numbers m corresponding to the obtained values MAX in the memory 20 (step S211). The magnetic-pole positions θ corresponding to the obtained sections m are in sections of every 60 degrees in a similar manner to that of the first embodiment.

Figure 12:
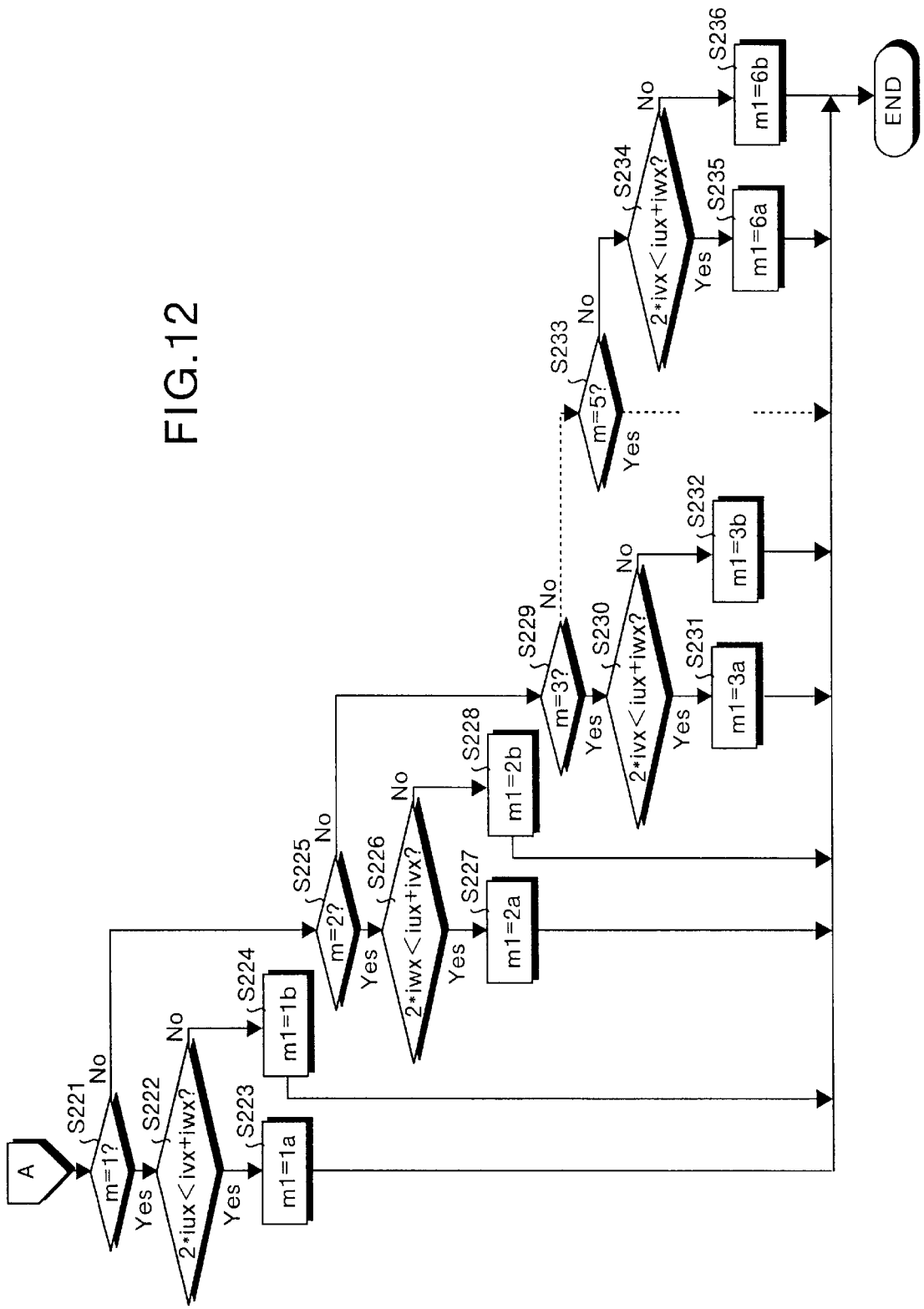
FIG. 12 is a flowchart (part 2) showing the detection processing procedure of magnetic-pole positions θ by the arithmetic section 2 in the second embodiment of the present invention.

Further, in FIG. 12, the arithmetic section 2 makes a decision about whether the section number m is "1" or not (step S221). When the section number m is "1" (step S221, YES), the arithmetic section 2 makes a decision about whether or not the section number m has a large-and-small relationship of 2* iux<ivx+iwx using the currents iux, ivx and iwx calculated at step S209 (step S222). When the section number m has a large-and-small relationship of 2*iux<ivx+iwx (steps S222, YES), the arithmetic section 2 sets the section number m1 to "1a", and outputs the section number m1 to the output circuit 23. The output circuit 23 outputs a magnetic-pole position θ corresponding to the input section number m1, that is, "−15 degrees", to the outside (step S223). Thus, the present processing is finished. On the other hand, when the section number m does not have a large-and-small relationship of 2*iux<ivx+iwx (steps S222, NO), the arithmetic section 2 sets the section number m1 to "1b", and outputs the section number m1 to the output circuit 23. The output circuit 23 outputs a magnetic-pole position θ corresponding to the input section number m1, that is, "15 degrees", to the outside (step S224). Thus, the present processing is finished.

On the other hand, when the section number m is not "1" (step S221, NO), that is, when the section number m is "2" to "6", the arithmetic section 2 makes a decision about whether the section number m is "2" or not (step S225). When the section number m is "2" (step S225, YES), the arithmetic section 2 makes a decision about whether or not the section number m has a large-and-small relationship of 2*iwx<iux+ivx using the currents iux, ivx and iwx calculated at step S209 (step S226). When the section number m has a large-and-small relationship of 2*iwx<iux+ivx (steps S226, YES), the arithmetic section 2 sets the section number m1 to "2a", and outputs the section number m1 to the output circuit 23. The output circuit 23 outputs a magnetic-pole position θ corresponding to the input section number m1, that is, "45 degrees", to the outside (step S227). Thus, the present processing is finished. On the other hand, when the section number m does not have a large-and-small relationship of 2* iwx<iux+ivx (steps S226, NO), the arithmetic section 2 sets the section number m1 to "2b", and outputs the section number m1 to the output circuit 23. The output circuit 23 outputs a magnetic-pole position θ corresponding to the input section number m1, that is, "75 degrees", to the outside (step S228). Thus, the present processing is finished.

In a similar manner to the above, a decision is made about the correspondence of the section numbers m to "3" to "5", and a decision is made about large-and-small relationships using the currents iux, ivx and iwx. Similarly, the section numbers m1 are set to "3a" to "6a", and the magnetic-pole positions θ are output to the outside.

According to the second embodiment, the voltage vectors V1 to V6 that either increase monotonously or decrease monotonously and that have application times sufficient enough for the coil of the synchronous motor 1 to be magnetically saturated are applied to the synchronous motor 1. Therefore, it is possible to correctly detect the magnetic-pole positions θ in the precision of ±15 degrees based on the large-and-small relationships of the currents iux, ivx and iwx without receiving the influence of the nonlinear elements like the hysteresis characteristic of the synchronous motor 1.

A third embodiment will be explained next. In the second embodiment, the magnetic-pole positions θ are correctly detected in the precision of +15 degrees using decision-making equations based on the large-and-small relationships of the currents iux, ivx and iwx. On the other hand, in the third embodiment, the magnetic-pole positions θ are correctly detected in the precision of ±15 degrees based on whether the values of the currents iux, ivx and iwx exceed an absolute reference value "0" or not, instead of using the decision-making equations based on the large-and-small relationships of the currents iux, ivx and iwx.

The structure of the third embodiment is identical to that of the first embodiment, except the structure of the arithmetic section 2 as the arithmetic section 2 in the third embodiment carries out a processing different from that of the first embodiment shown in FIG. 1.

In FIG. 10, any one of the currents iux, ivx and iwx crosses the current value "0" at every 30 degrees of the magnetic-pole positions θ. Then, the current value "0" is crossed at magnetic-pole positions θ that divide the magnetic-pole positions θ of every 60 degrees into two. Therefore, it is possible to specify the magnetic-pole positions θ at every 30 degrees by making a decision about plus or minus of the currents iux, ivx and iwx corresponding to the respective ranges of magnetic-pole positions θ. For example, within the range from −30 to zero degrees out of the range of the magnetic-pole positions θ from −30 to 30 degrees, the current iux has a large-and-small relationship of iux<0. Within the range from zero to 30 degrees out of the range of the magnetic-pole positions θ from −30 to 30 degrees, the current iux has a large-and-small relationship of iux>0. Therefore, it is possible to specify the magnetic-pole positions θ at every 30 degrees by using these large-and-small relationships.

In other words, for making a decision about whether the section number m1 is "1a" or "1b", the large-and-small relationship of "iux<0" is used, instead of using the large-and-small relationship "2*iux<ivx+iwx" as used in the second embodiment. For other section numbers m1, a decision is made in a similar manner based on the large-and-small relationships using the absolute reference In other words, when the section numbers of sections for the magnetic-pole positions θ that change at every 30 degrees are defined as section number m2, there are following relationships.

| number m2 | Section | relationship |
|---|---|---|
| 1a | −30 to 0 degrees | iux < 0 |
| 1b | 0 to 30 degrees | iux > 0 |
| 2a | 30 to 60 degrees | iwx < 0 |
| 2b | 60 to 90 degrees | iwx > 0 |
| 3a | 90 to 120 degrees | ivx < 0 |
| 3b | 120 to 150 degrees | ivx > 0 |
| 4a | 150 to 180 degrees | iux < 0 |
| 4b | 180 to 210 degrees | iux > 0 |
| 5a | 210 to 240 degrees | iwx < 0 |
| 5b | 240 to 270 degrees | iwx > 0 |
| 6a | 270 to 300 degrees | ivx < 0 |
| 6b | 300 to 330 degrees | ivx > 0 |

Figure 13:
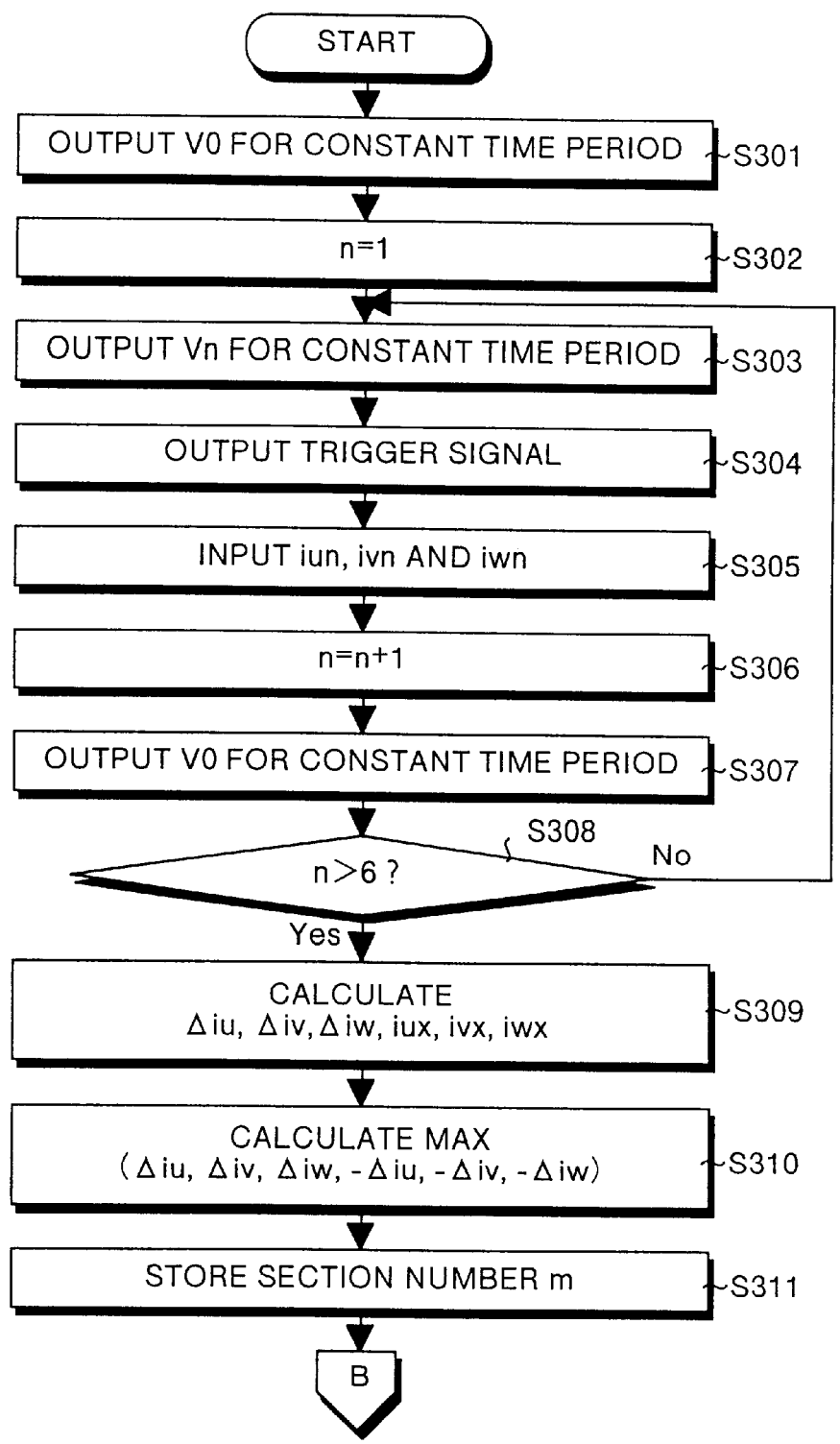
FIG. 13 is a flowchart (part 1) showing a detection processing procedure of magnetic-pole positions θ by an arithmetic section 2 in a third embodiment of the present invention.
Figure 14:
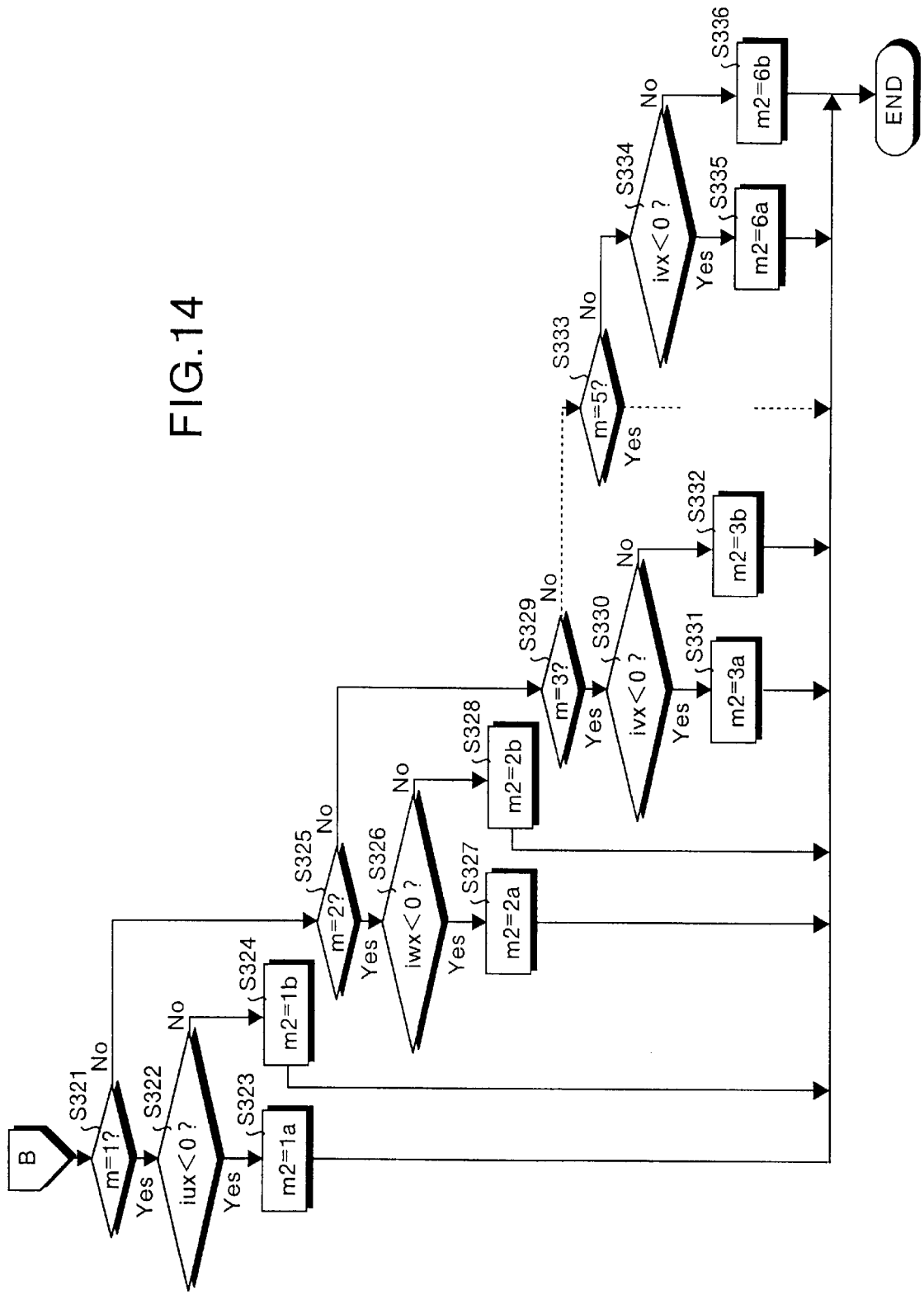
FIG. 14 is a flowchart (part 2) showing the detection processing procedure of magnetic-pole positions θ by the arithmetic section 2 in the third embodiment of the present invention.

A method of detecting a magnetic-pole position θ by the arithmetic section 2 in the third embodiment will beexplained with reference to a flowchart shown in FIG. 13 and FIG. 14. Referring to FIG. 13, the arithmetic section 2 first applies the voltage vectors V0, V1, V0, V2, V0, V3, V0, V4, V0, V6 and V0 in this order to the synchronous motor 1 via the circuit section 3 for a constant time period sufficient enough for the synchronous motor 1 to be magnetically saturated at steps S301 to S308, in a similar manner to that at steps S201 to S208 in the second embodiment. Thus, the arithmetic section 2 carries out a processing to obtain at least the currents iu1, iw2, iv3, iu4, iw5 and iv6.

Further, at steps S309 to S311, the arithmetic section 2 calculates the currents iu, iv, iw, iux, ivx and iwx, and calculates the values MAX (iu, iv, iw, −iu, −iv, −iw), in a similar manner to that of the second embodiment. The arithmetic section 2 then stores the section numbers m corresponding to the obtained values MAX in the memory 20. The processing up to this stage is exactly the same as that of the second embodiment. The magnetic-pole positions θ corresponding to the obtained sections m are in sections of every 60 degrees in a similar manner to that of the second embodiment.

Further, in FIG. 14, the arithmetic section 2 makes a decision about whether the section number m is "1" or not (step S221). When the section number m is "1" (step S321, YES), the arithmetic section 2 makes a decision about whetheror not the section number m has a large-and-small relationship of iux<0 using the currents iux, ivx and iwx calculated at step S309 (step S322). When the section number m has a large-and-small relationship of iux<0 (steps S322, YES), the arithmetic section 2 sets the section number m2 to "1a", and outputs the section number m2 to the outputcircuit 23. The output circuit 23 outputs a magnetic-pole position θ corresponding to the input section number m2, that is, "−15 degrees", to the outside (step S323). Thus, the present processing is finished. On the other hand, when the section number m does not have a large-and-small relationship of iux<0 (steps S322, NO), the arithmetic section 2 sets the section number m2 to "1b", and outputs the section number m2 to the output circuit 23. The output circuit 23 outputs a magnetic-pole position θ corresponding to the input section number m2, that is, "15 degrees", to the outside (step S324). Thus, the present processing is finished.

On the other hand, when the section number m is not "1" (step S321, NO), that is, when the section number m is "2" to "6", the arithmetic section 2 makes a decision about whether the section number m is "2" or not (step S325).

When the section number m is "2" (step S325, YES), the arithmetic section 2 makes a decision about whether or not the section number m has a large-and-small relationship of iwx<0 using the currents iux, ivx and iwx calculated at step S309 (step S326). When the section number m has a large-and-small relationship of iwx<0 (steps S326, YES), the arithmetic section 2 sets the section number m2 to "2a", and outputs the section number m2 to the output circuit 23. The output circuit 23 outputs a magnetic-pole position θ corresponding to the input section number m2, that is, "45 degrees", to the outside (step S327). Thus, the present processing is finished. On the other hand, when the section number m does not have a large-and-small relationship of iwx<0 (steps S326, NO) the arithmetic section 2 sets the section number m2 to "2b", and outputs the section number m2 to the output circuit 23. The output circuit 23 outputs a magnetic-pole position θ corresponding to the input section number m2, that is, "75 degrees", to the outside (step S328). Thus, the present processing is finished.

In a similar manner to the above, a decision is made about the correspondence of the section numbers m to "3" to "5", and a decision is made about large-and-small relationships using the currents iux, ivx and iwx. Similarly, the section numbers m2 are set to "3a" to "6a", and the magnetic-pole positions θ are output to the outside.

According to the third embodiment, the voltage vectors V1 to V6 that either increase monotonously or decrease monotonously and that have application times sufficient enough for the coil of the synchronous motor 1 to be magnetically saturated are applied to the synchronous motor 1. Therefore, it is possible to correctly detect the magnetic-pole positions θ in the precision of ±15 degrees based on the simple large-and-small relationships of the currents iux, ivx and iwx without receiving the influence of the nonlinear elements like the hysteresis characteristic of the synchronous motor 1. At the same time, the magnetic-pole positions θ are detected based on the simple large-and-small relationship. Therefore, it is possible to carry out the processing in a smaller calculation volume than that of the second embodiment.

A fourth embodiment will be explained next. In the second and third embodiments, the magnetic-pole positions θ are correctly detected in the precision of ±15 degrees using decision-making equations based on the large-and-small relationships of the currents iux, ivx and iwx. On the other hand, in the fourth embodiment, the magnetic-pole positions θ are correctly detected in the precision of ±7.5 degrees using further decision-making equations based on the large-and-small relationships of the currents iux, ivx and iwx.

The structure of the fourth embodiment is identical to that of the first embodiment, except the structure of the arithmetic section 2 as the arithmetic section 2 in the third embodiment carries out a processing different from that of the first embodiment shown in FIG. 1.

In FIG. 10, any two currents iux, ivx and iwx of the currents iux, ivx and iwx cross the magnetic-pole positions θ at every 30 degrees. For example, within the range of magnetic-pole positions θ from −30 to zero degrees, the current iux and the current iwx cross each other at the magnetic-pole position θ of −15 degrees. In this case, by making a decision about the large-and-small relationships of the current iux and the current iwx that cross each other, it becomes possible to specify the magnetic-pole positions θ in higher precision.

In other words, by making a decision about the large-and-small relationship between the current iux and the current iwx in the region of the magnetic-pole position θ where the section number m2 shown in the second and third embodiments have the section "1a", it is possible to specify the regions of the magnetic-pole positions θ at every 15 degrees. In other words, when the section numbers of sections for the magnetic-pole positions θ that change at every 15 degrees are defined as section number m3, there are following relationships.

| number m3 | Section | relationship |
|---|---|---|
| 1aα | −30 to −15 degrees | iux < iwx |
| 1aβ | −15 to 0 degrees | iux > iwx |
| 1bα | 0 to 15 degrees | iux < ivx |
| 1bβ | 15 to 30 degrees | iux > ivx |
| 2aα | 30 to 45 degrees | iwx < ivx |
| 2aβ | 45 to 60 degrees | iwx > ivx |
| 2bα | 60 to 75 degrees | iwx < iux |
| 2bβ | 75 to 90 degrees | iwx > iux |
| 3aα | 90 to 105 degrees | ivx < iux |
| 3aβ | 105 to 120 degrees | ivx > iux |
| 3bα | 120 to 135 degrees | ivx < iwx |
| 3bβ | 135 to 150 degrees | ivx > iwx |
| 4aα | 150 to 165 degrees | iux < iwx |
| 4aβ | 165 to 180 degrees | iux > iwx |
| 4bα | 180 to 195 degrees | iux < ivx |
| 4bβ | 195 to 210 degrees | iux > ivx |
| 5aα | 210 to 225 degrees | iwx < ivx |
| 5aβ | 225 to 240 degrees | iwx > ivx |
| 5bα | 240 to 255 degrees | iwx < iux |
| 5bβ | 255 to 270 degrees | iwx > iux |
| 6aα | 270 to 385 degrees | ivx < iux |
| 6aβ | 385 to 300 degrees | ivx > iux |
| 6bα | 300 to 315 degrees | ivx < iwx |
| 6bβ | 315 to 330 degrees | ivx > iwx |

Figure 15:
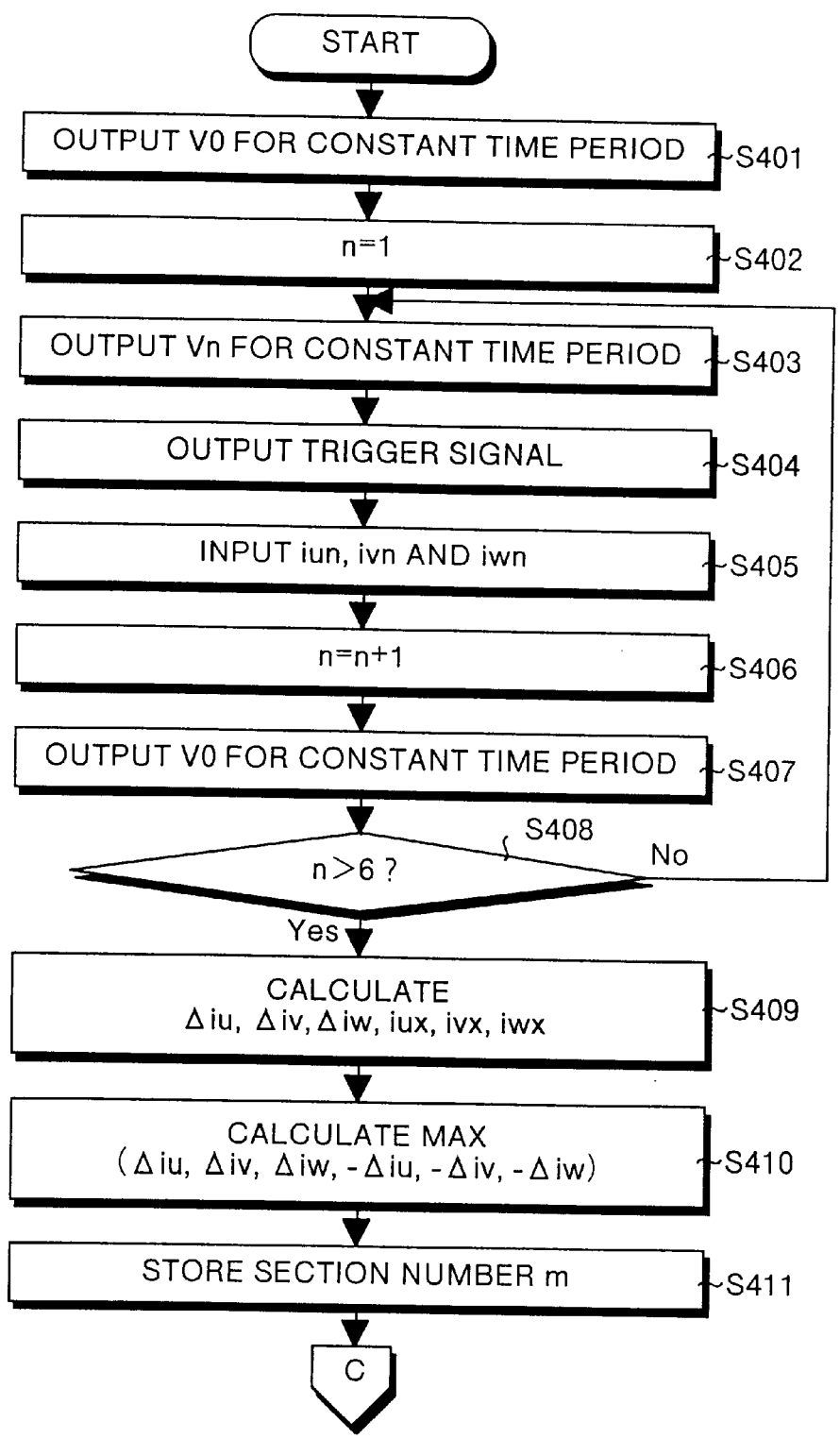
FIG. 15 is a flowchart (part 1) showing a detection processing procedure of magnetic-pole positions θ by an arithmetic section 2 in a fourth embodiment of the present invention.

A method of detecting a magnetic-pole position θ by the arithmetic section 2 in the fourth embodiment will be explained with reference to a flowchart shown in FIG. 15 and FIG. 17. Referring to FIG. 15, the arithmetic section 2 first applies the voltage vectors V0, V1, V0, V2, V0, V3, V0, V4, V0, V6 and V0 in this order to the synchronous motor 1 via the circuit section 3 for a constant time period sufficient enough for the synchronous motor 1 to be magnetically saturated at steps S401 to S408, in a similar manner to that at steps S201 to S208 in the second embodiment. Thus, the arithmetic section 2 carries out a processing to obtain at least the currents iu1, iw2, iv3, iu4, iw5 and iv6.

Further, at steps S409 to S411, the arithmetic section 2 calculates the currents Δiu, Δiv, Δiw, iux, ivx and iwx, and calculates the values MAX (Δiu, Δiv, Δiw, −Δiu, −Δiv, −Δiw), in a similar manner to that of the second embodiment. The arithmetic section 2 then stores the section numbers m corresponding to the obtained values MAX in the memory 20. The processing up to this stage is exactly the same as that of the second embodiment. The magnetic-pole positions θ corresponding to the obtained sections m are in sections of every 60 degrees in a similar manner to that of the second embodiment.

Further, in FIG. 15, the arithmetic section 2 makes a decision about the values of the section number m at steps S421 to S436 in a similar manner to that of the second embodiment. Based on a result of this decision made, in order to further divide each region of the magnetic-pole positions θ into two at every 30 degrees, the arithmetic section 2 sets the values of the section number m1 by the decision-making equations of the large-and-small relationships using the currents iux, ivx and iwx, and stores a result in the memory 20. Thus, the regions of the magnetic-pole positions θ are divided into regions of every 30 degrees in a similar manner to that of the second embodiment.

Figure 17:
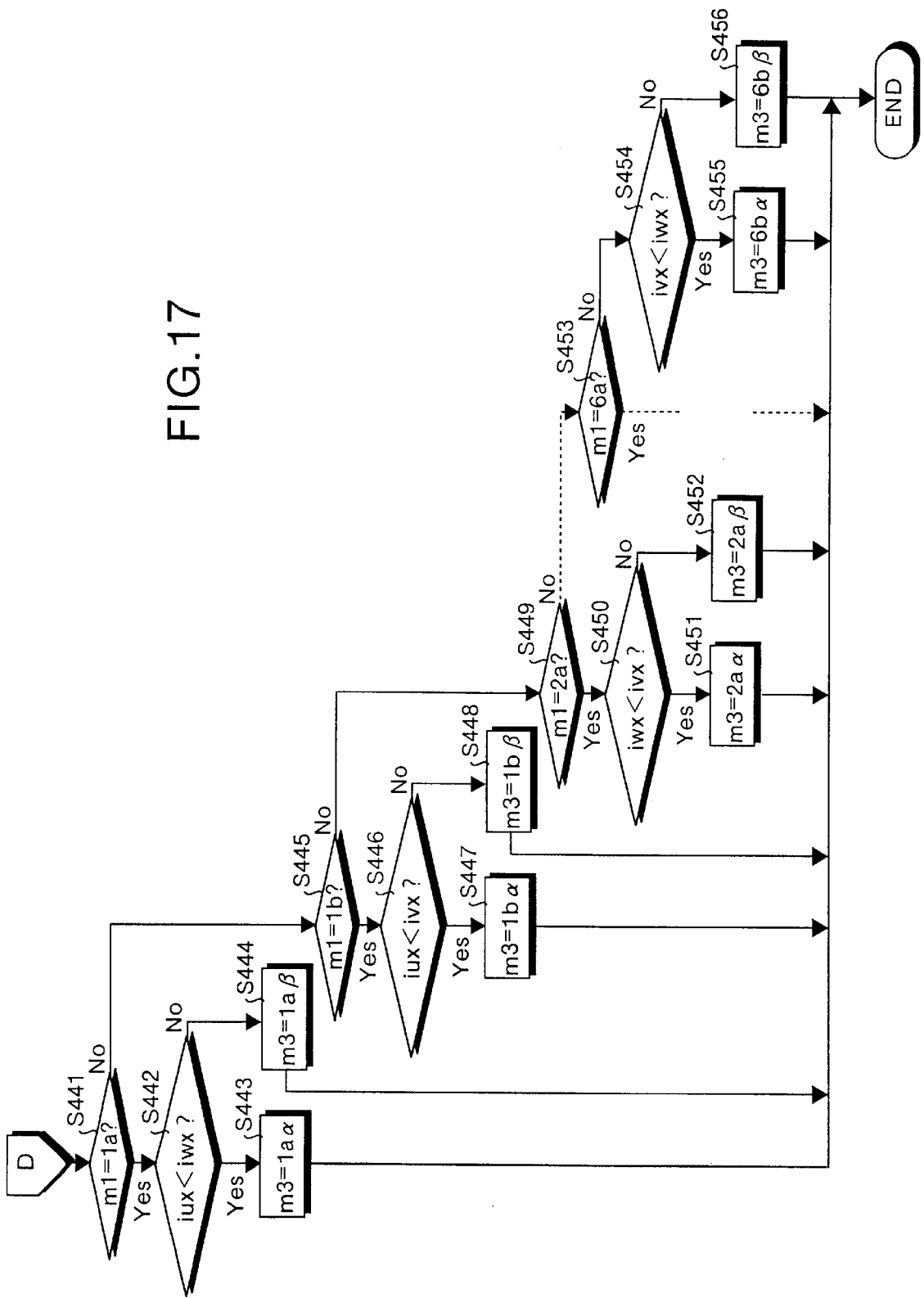
FIG. 17 is a flowchart (part 3) showing the detection processing procedure of magnetic-pole positions θ by the arithmetic section 2 in the fourth embodiment of the present invention.

Thereafter, in FIG. 17, the arithmetic section 2 makes a decision about whether the section number m1 is "1a" or not (step S441). When the section number m1 is "1a", the arithmetic section 2 further makes a decision about whether or not the section number m1 has a large-and-small relationship of iux<iwx (step S442). When the section number m1 has a large-and-small relationship of iux<iwx (steps S442, YES), the arithmetic section 2 sets the section number m3 to "1aα", and outputs the set section number m3 to the output circuit 23. The output circuit 23 outputs a magnetic-pole position θ corresponding to the input section number m3, that is, "−22.5 degrees", to the outside (step S443). Thus, the present processing is finished. On the other hand, when the section number m1 does not have a large-and-small relationship of iux<iwx (steps S442, NO) the arithmetic section 2 sets the section number m3 to "1aρ", and outputs the set section number m3 to the output circuit 23. The output circuit 23 outputs a magnetic-pole position θ corresponding to the section number m2, that is, "−7.5 degrees", to the outside (step S444). Thus, the present processing is finished.

On the other hand, when the section number m1 is not "1a" (step S441, NO), that is, when the section number m1 is "1b" to "6b", the arithmetic section 2 makes a decision about whether the section number m1 is "1b" or not (stepS445). When the section number m1 is "1b" (step S445, YES) the arithmetic section 2 further makes a decision about whether or not the section number m1 has a large-and-small relationship of iux<ivx using the currents iux, ivx and iwx calculated at step S209 (step S446). When the section number m1 has a large-and-small relationship of iux<ivx (steps S446, YES), the arithmetic section 2 sets the section number m3 to "1bα", and outputs the section number m3 to the output circuit 23. The output circuit 23 outputs a magnetic-pole position θ corresponding to the input section number m3, that is, "7.5 degrees", to the outside (step S447). Thus, the present processing is finished. On the other hand, when the section number m1 does not have a large-and-small relationship of iux<ivx (steps S446, NO), the arithmetic section 2 sets the section number m3 to "1bβ", and outputs the section number m3 to the output circuit 23. The output circuit 23 outputs a magnetic-pole position θ corresponding to the input section number m3, that is, "22.5 degrees", to the outside (step S448). Thus, the present processing is finished.

In a similar manner to the above, a decision is made about the correspondence of the section numbers m3 to "2a" to "6a", and a decision is made about a large-and-small relationship at every 15 degrees using the currents iux, ivx and iwx. Similarly, the section numbers m3 are set to "2aβ" to "6bβ", and the magnetic-pole positions θ are outputto the outside.

Figure 16:
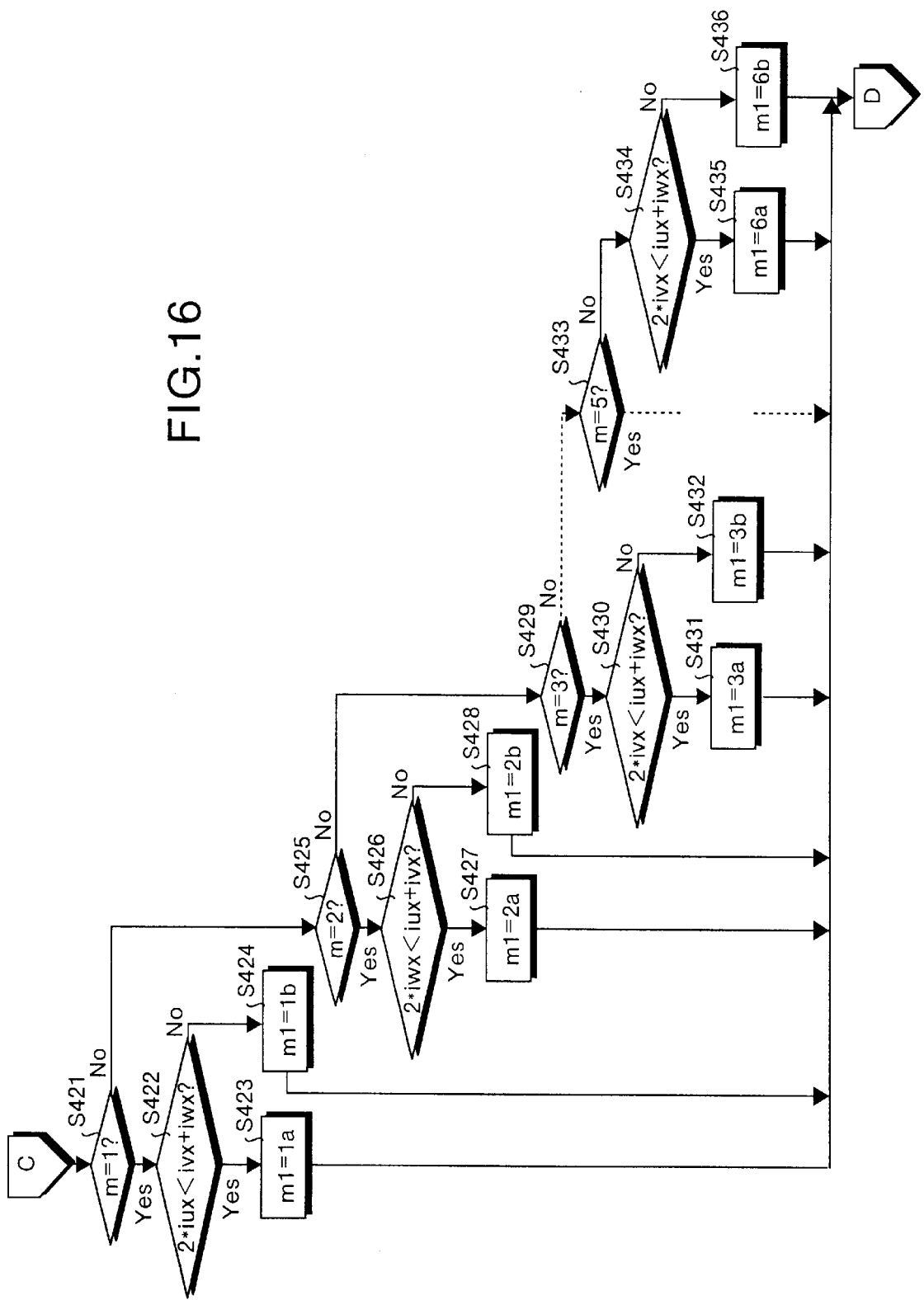
FIG. 16 is a flowchart (part 2) showing the detection processing procedure of magnetic-pole positions θ by the arithmetic section 2 in the fourth embodiment of the present invention.

The processing at steps S421 to S436 shown in FIG. 16 may also be carried out by dividing the magnetic-pole positions θ into regions of every 30 degrees in a similar manner to that of the third embodiment shown in FIG. 14.

According to the fourth embodiment, the voltage vectors V1 to V6 that either increase monotonously or decrease monotonously and that have application times sufficient enough for the coil of the synchronous motor 1 to be magnetically saturated are applied to the synchronous motor 1. Therefore, it is possible to correctly detect the magnetic-pole positions θ in the precision of ±7.5 degrees based on the simple large-and-small relationship of the currents iux, ivx and iwx without receiving the influence of the nonlinear elements like the hysteresis characteristic of the synchronous motor 1.

A fifth embodiment will be explained next. In the second to fourth embodiments, the magnetic-pole positions θ are correctly detected in the precision of ±15 degrees or +7.5 degrees using decision-making equations based on the large-and-small relationships of the currents iux, ivx and iwx. On the other hand, in the fifth embodiment, the magnetic-pole positions θ are correctly detected in the precision of ±3.75 degrees using further decision-making equations based on the large-and-small relationships of the currents iux, ivx and iwx.

The structure of the fifth embodiment is identical to that of the first embodiment, except the structure of the arithmetic section 2 as the arithmetic section 2 in the third embodiment carries out a processing different from that of the first embodiment shown in FIG. 1.

In the fifth embodiment, new functions are generated for the magnetic-pole positions θ using the currents iux, ivx and iwx, instead of using the large-and-small relationship based on the changes in the currents iux, ivx and iwx by themselves. Then, the magnetic-pole positions θ are divided into regions of every 15 degrees using these functions and the large-and-small relationships of the currents iux, ivx and iwx.

The new functions used are as follows.

Figure 18:
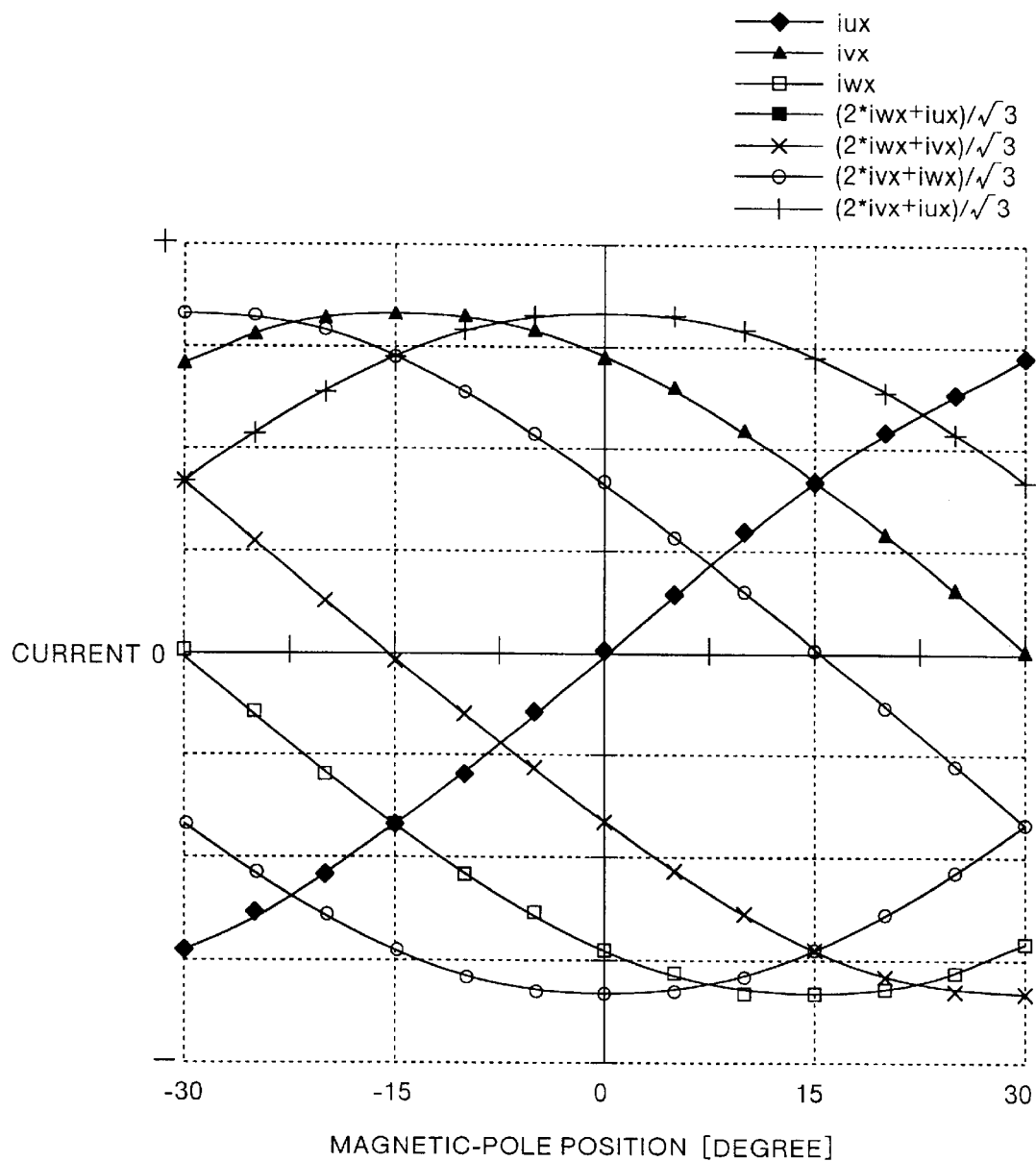
FIG. 18 is a diagram showing a relationship among magnetic-pole positions θ, currents iux, ivx, and iwx used in a fifth embodiment of the present invention, and new functional values using the currents iux, ivx, and iwx.

$(2*iwx+iux)/\sqrt{3}$ $(2*iwx+ivx)/\sqrt{3}$ $(2*ivx+iwx)/\sqrt{3}$ $(2*ivx+iux)/\sqrt{3}$ FIG. 18 is a diagram showing changes in the currents iux, ivx, and iwx and the four functions within the range of the magnetic-pole positions θ from −30 to 30 degrees. In FIG. 18, within the range of the magnetic-pole positions from −30 to 30 degrees, for example, the current iux and the function $(2*iwx+iux)/\sqrt{3}$ cross each other at the magnetic-pole position θ of "−22.5 degrees". Further, within the range of the magnetic-pole positions θ from −15 to zero degrees, for example, the current iux and the function $(2*iwx+ivx)/\sqrt{3}$ cross each other at the magnetic-pole position θ of "−7.5 degrees". Therefore, it is possible to divide the regions of the magnetic-pole positions θ into further smaller regions based on a decision made about the large-and-small relationship between the currents iux, ivx, and iwx and the newly generated functions. As a result, it is possible to specify magnetic-pole positions θ in higher precision.

When the section numbers of sections for the magnetic-pole positions θ that change at every 7.5 degrees are defined as section number m4, there are following relationships. While only the ranges of the magnetic-pole positions 0 from −30 to 30 degrees will be explained below, it is also possible to divide the ranges of other magnetic-pole positions κ in a similar manner.

| m4 | Section (degree) | Relationship |
| --- | --- | --- |
| 1aαx | −30.0 to −22.5 | iux < (2*iwx + iux)/√(3) |
| 1aαy | −22.5 to −15.0 | iux > (2*iwx + iux)/√(3) |
| 1aβx | −15.0 to −7.5 | iux < (2*iwx + ivx)/√(3) |
| 1aβy | −7.5 to 0.0 | iux > (2*iwx + ivx)/√(3) |
| 1bαx | 0.0 to 7.5 | iux < (2*ivx + iwx)/√(3) |
| 1bαy | 7.5 to 15.0 | iux > (2*ivx + iwx)/√(3) |

-continued

| m4 | Section (degree) | Relationship |
| --- | --- | --- |
| 1bβx | 15.0 to 22.5 | iux < (2*ivx + iux)/√(3) |
| 1bβy | 22.5 to 30.0 | iux > (2*ivx + iux)/√(3) |

Figure 19:
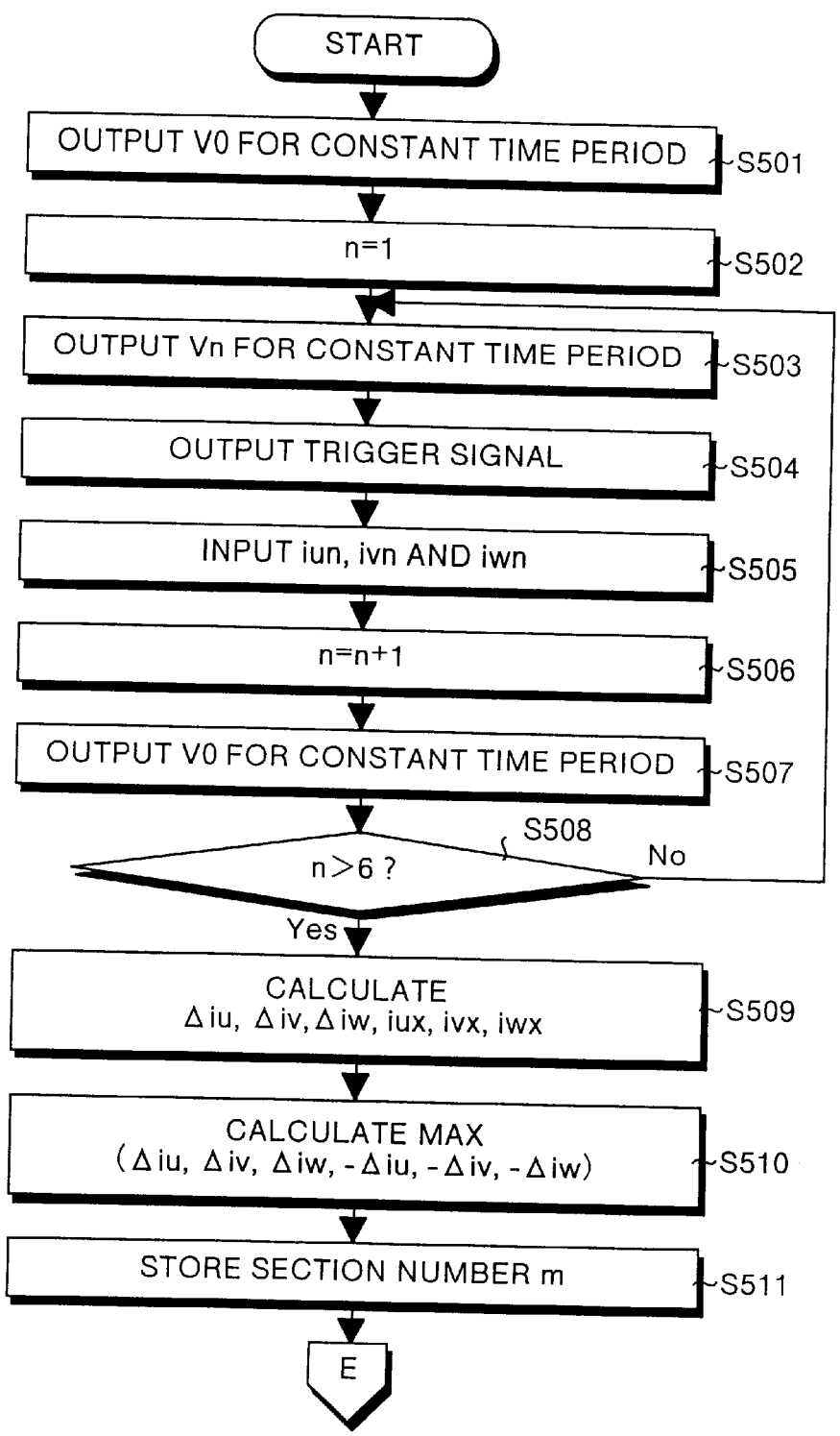
FIG. 19 is a flowchart (part 1) showing a detection processing procedure of magnetic-pole positions θ by an arithmetic section 2 in the fifth embodiment of the present invention.

A method of detecting a magnetic-pole position θ by the arithmetic section 2 in the fifth embodiment will be explained with reference to a flowchart shown in FIG. 19 and FIG. 22. Referring to FIG. 19, the arithmetic section 2 first applies the voltage vectors V0, V1, V0, V2, V0, V3, V0, V4, V0, V6 and V0 in this order to the synchronous motor 1 via the circuit section 3 for a constant time period sufficient enough for the synchronous motor 1 to be magnetically saturated at steps S501 to S508, in a similar manner to that at steps S401 to S408 in the fourth embodiment. Thus, the arithmetic section 2 carries out a processing to obtain at least the currents iu1, iw2, iv3, iu4, iw5 and iv6.

Further, at steps S509 to S511, the arithmetic section 2 calculates the currents Δiu, Δiv, Δiw, iux, ivx and iwx, and calculates the values MAX (Δiu, Δiv, Δiw, −Δiu, −Δiv, −Δiw), in a similar manner to that of the fourth embodiment. The arithmetic section 2 then stores the section numbers m corresponding to the obtained values MAX in the memory 20. Based on the processing up to this stage, it is possible to divide the sections into sections of every 60 degrees.

Figure 20:
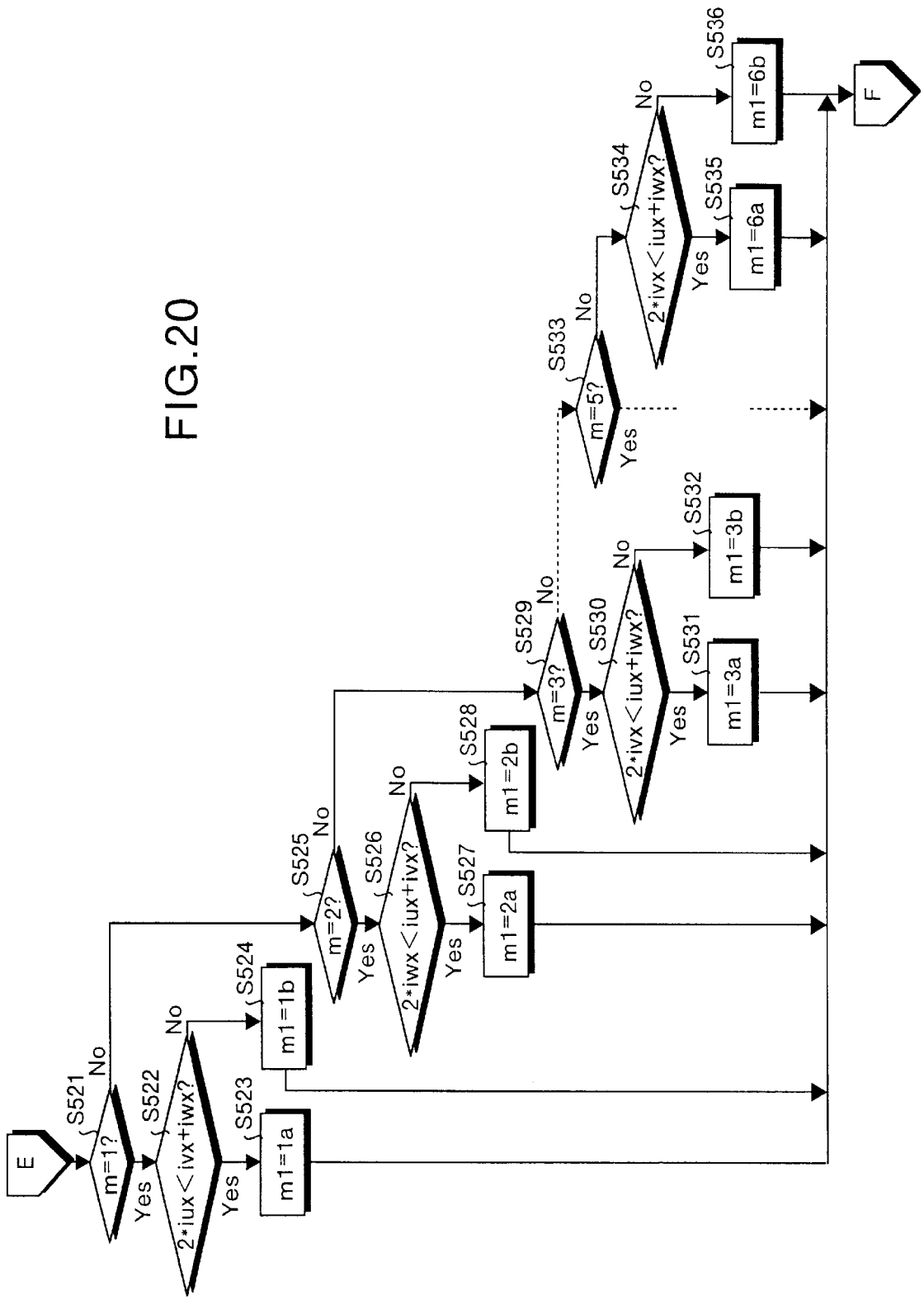
FIG. 20 is a flowchart (part 2) showing the detection processing procedure of magnetic-pole positions θ by the arithmetic section 2 in the fifth embodiment of the present invention.

Further, in FIG. 20, the arithmetic section 2 makes a decision about the values of the section number m at steps S521 to S536 in a similar manner to that of the fourth embodiment. Based on a result of this decision made, in order to further divide each region of the magnetic-pole positions θ into two at every 30 degrees, the arithmetic section 2 sets the values of the section number m1 by the decision-making equations of the large-and-small relationships using the currents iux, ivx and iwx, and stores a result in the memory 20. Thus, each region of the magnetic-pole positions θ at every 60 degrees is further divided into two regions of every 30 degrees.

Figure 21:
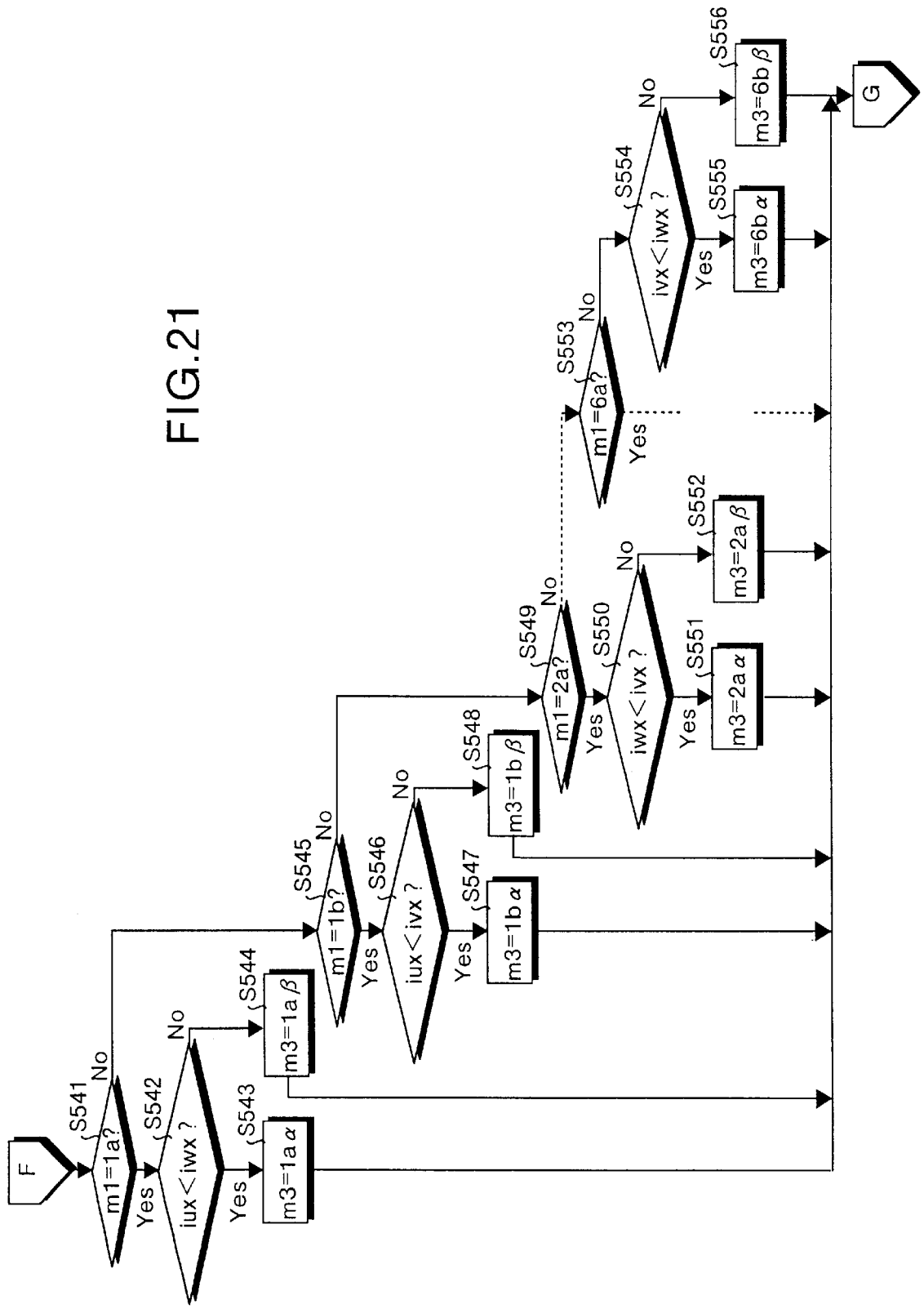
FIG. 21 is a flowchart (part 3) showing the detection processing procedure of magnetic-pole positions θ by the arithmetic section 2 in the fifth embodiment of the present invention.

Further, in FIG. 21, the arithmetic section 2 makes a decision about the values of the section number m1 at steps S541 to S556 in a similar manner to that of the fourth embodiment. Based on a result of this decision made, in order to further divide each region of the magnetic-pole positions θ into two at every 15 degrees, the arithmetic section 2 sets the values of the section number m3 by the decision-making equations of the large-and-small relationships using the currents iux, ivx and iwx, and stores a result in the memory 20. Thus, each region of the magnetic-pole positions 0 at every 30 degrees is further divided into two regions of every 15 degrees.

Figure 22:
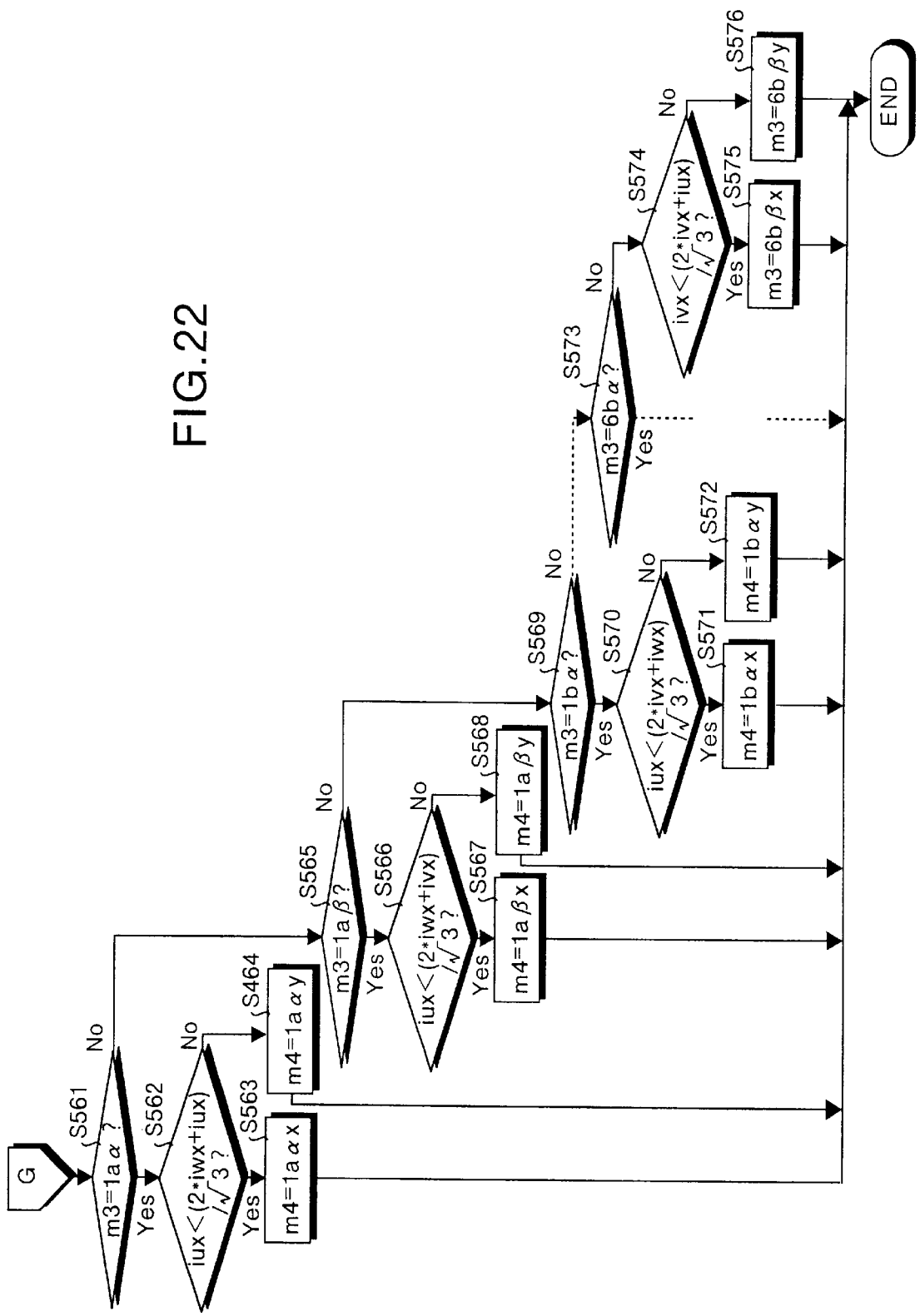
FIG. 22 is a flowchart (part 4) showing the detection processing procedure of magnetic-pole positions θ by the arithmetic section 2 in the fifth embodiment of the present invention.

Thereafter, in FIG. 22, the arithmetic section 2 divides each region of the magnetic-pole positions θ at every 15 degrees into two by making a decision about large-and-small relationships between the currents iux, ivx and iwx and the newly generated functions respectively. First, the arithmetic section 2 makes a decision about whether the section number m3 is "1aα" or not (step S561) When the section number m3 is "1aα", the arithmetic section 2 further makes a decision about whether or not the section number m3 has a large-and-small relationship of iux<(2*iwx+iux)/√(3) (step S562). When the section number m3 has a large-and-small relationship of iux<(2*iwx+iux)/√(3) (steps S562, YES), the arithmetic section 2 sets the section number m4 to "1aα", and outputs the set section number m4 to the output circuit 23. The output circuit 23 outputs a magnetic-pole position θ corresponding to the input section number m4, that is, "−26.25 degrees", to the outside (step S563). Thus, the present processing is finished. On the other hand, when the section number m4 does not have a large-and-small relationship of iux<(2* iwx+iux)/√(3) (steps S562, NO), the arithmetic section 2 sets the section number m4 to "1aαy ", and outputs the set section number m4 to the output circuit 23. The output circuit 23 outputs a magnetic-pole position θ corresponding to the section number m4, that is, "−18.75 degrees", to the outside (step S564). Thus, the present processing is finished.

On the other hand, when the section number m3 is not "1aα" (step S561, NO), that is, when the section number m3 is "1aα" to "6bβ", the arithmetic section 2 further makes a decision about whether the section number m3 is "1aβ" or not (step S565). When the section number m3 is "1aβ" (step S565, YES), the arithmetic section 2 further makes a decision about whether or not the section number m3 has a large-and-small relationship of iux<(2* iwx+ivx)/√(3) (step S566). When the section number m3 has a large-and-small relationship of iux<(2*iwx+ivx)/√(3) (steps S566, YES), the arithmetic section 2 sets the section number m4 to "1aβx", and outputs the section number m4 to the output circuit 23. The output circuit 23 outputs a magnetic-pole position θ corresponding to the input section number m4, that is, "−11.75 degrees", to the outside (step S567). Thus, the present processing is finished. On the other hand, when the section number m3 does not have a large-and-small relationship of iux<(2*iwx+ivx)/√(3) (steps S566, NO), the arithmetic section 2 sets the section number m4 to "1aβy", and outputs the section number m4 to the output circuit 23. The output circuit 23 outputs a magnetic-pole position θ corresponding to the input section number m4, that is, "−3.75 degrees", to the outside (step S568). Thus, the present processing is finished.

In a similar manner to the above, a decision is made about the correspondence of the section numbers m3 to "1bα" to "6bα", and a decision is made about a large-and-small relationship at every 7.5 degrees. Similarly, the sectionnumbers m4 are set to "2bαx" to "6bβy", and the magnetic-pole positions θ are output to the outside.

According to the fifth embodiment, the voltage vectors V1 to V6 that either increase monotonously or decrease monotonously and that have application times sufficient enough for the coil of the synchronous motor 1 to be magnetically saturated are applied to the synchronous motor 1. Therefore, it is possible to correctly detect the magnetic-pole positions θ in the precision of ±7.5 degrees based on the large-and-small relationship between the currents iux, ivx and iwx and the values of the functions newly generated using the currents iux, ivx and iwx, without receiving the influence of the nonlinear elements like the hysteresis characteristic of the synchronous motor 1.

A sixth embodiment will be explained next. In the first to fifth embodiments, a description has been made based on the assumption that the synchronous motor 1 is in the halted state and the rotor is not in the rotating state. On the other hand, in the sixth embodiment, the structures and the processing of the above-described first to fifth embodiments are applied in the state that the synchronous motor 1 is rotating.

When the voltage vectors V1 to V6 applied are sufficiently larger than the induced voltage of the synchronous motor 1 while the synchronous motor 1 is rotating, the existence of this induced voltage can be disregarded.

Therefore, in the sixth embodiment, the voltage vectors V1 to V6 of the first to fifth embodiments are set to sufficiently larger values than the induced voltage. Based on this arrangement, it is possible to detect magnetic-pole positions θ in high precision even when the synchronous motor 1 is rotating.

A seventh embodiment will be explained next. In the second to sixth embodiments, the magnetic-pole positions θ are output using the currents iux, ivx and iwx of the components that are orthogonal with the voltage vectors V1 to V6. However, in the seventh embodiment, the magnetic-pole positions are output using the current values of the components in phase with the voltage vectors V1 to V6.

Referring to FIG. 9, when the voltage vector V1 is applied to the synchronous motor 1, for example, a current iuz1 of a U-phase in-phase component Ui that is a component in phase with the voltage vector V1 can be expressed by the following equation (21).

$$iuz1 = 2iu1 - iv1 - iw1 \tag{21}$$

Similarly, currents iwz2 to ivz6 that are components in phase with the voltage vectors V2 to V6 respectively when the voltage vectors V2 to V6 are applied to the synchronous motor 1 can be expressed by the following equations (22) to (26).

$$iwz2 = 2iw2 - iu2 - iv1 \tag{22}$$

$$ivz3 = 2iv3 - iw3 - iu3 \tag{23}$$

$$iuz4 = 2iu4 - iv4 - iw4 \tag{24}$$

$$iwz5 = 2iw5 - iu5 - iv5 \tag{25}$$

$$ivz6 = 2iv6 - iw6 - iu6 \tag{26}$$

Further, when combinations based on the addition of the currents iuz1 to ivz6 at phase positions of 180 degrees are defined in order to eliminate the influence of the magnetic saturation in a similar manner to that of the second embodiment, it is possible to obtain the currents iuz to iwz as shown by the following equations (27) to (29).

$$iuz = iuz1 + iuz4 - iz0 \tag{27}$$

$$ivz = ivz3 + ivz6 - iz0 \tag{28}$$

$$iwz = iuz2 + iwz5 - iz0 \tag{29}$$

where, "iz0" is a value given by the following equation (30).

$$iz0 = (iuz1 + iwz2 + ivz3 + iuz4 + iwz5 + ivz6)/3 \tag{30}$$

Figure 23:
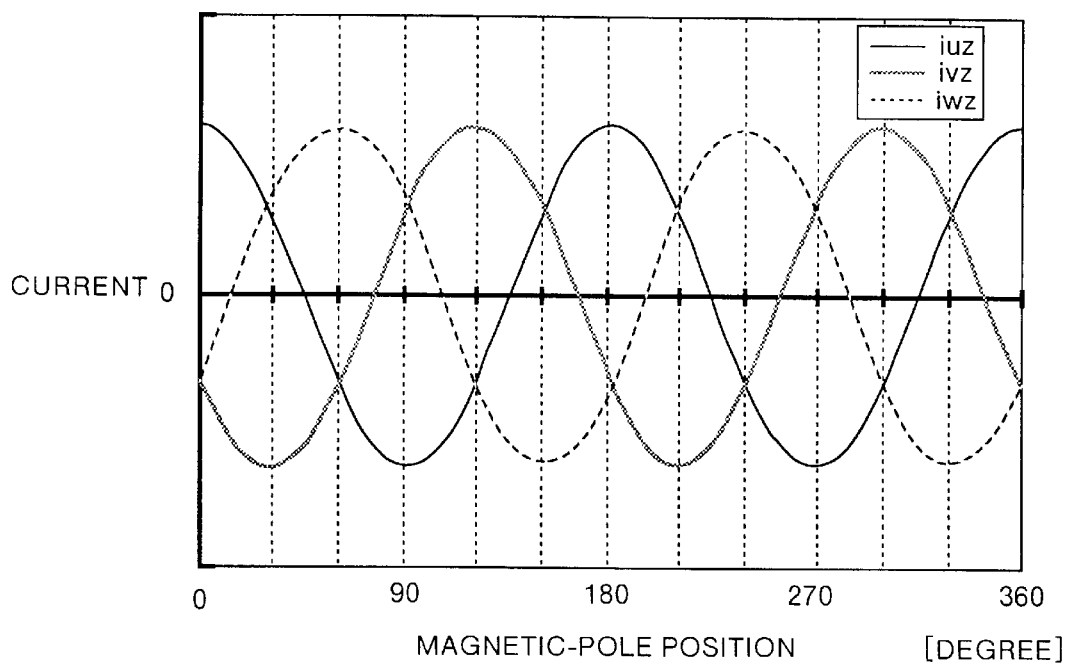
FIG. 23 is a diagram showing a relationship among currents iuz, ivz, and iwz and magnetic-pole positions θ.

The currents iuz, ivz and iwz obtained in this way and the magnetic-pole positions θ have a relationship as shown in FIG. 23. In FIG. 23, the currents iuz, ivz and iwz change in every 180-degree period without being affected by the magnetic saturation.

Therefore, it is possible to output magnetic-pole positions θ in a similar manner to that of the second to sixth embodiments by using the large-and-small relationships of the currents iuz, iuz and iwz, in place of the currents iux, ivx and iwx that are used in the second to sixth embodiments.

Industrial Applicability

As explained above, the magnetic-pole position detecting apparatus for a synchronous motor relating to the present invention is effective in the field of the synchronous motor that can be efficiently controlled in a simple structure. The magnetic-pole position detecting apparatus for a synchronous motor can detect magnetic-pole positions easily, correctly and in high precision.

What is claimed is:

1. A magnetic-pole position detecting apparatus for detecting position of a rotor of a synchronous motor comprising:

a circuit unit which applies voltage vectors to an nth (where n is a natural number and at least 3 ) phase winding of a synchronous motor based on a voltage vector command;

a detecting unit which detects currents on the nth phase winding generated by voltage vectors applied from the circuit unit; and an arithmetic unit which outputs the voltage vector command to the circuit unit, applies a trigger signal to the detecting unit immediately after an application of the voltage vectors based on the voltage vector command, so that the detecting unit detects currents on the nth phase winding, and calculates magnetic-pole positions of the synchronous motor based on the currents detected, and outputs the magnetic-pole positions calculated, wherein the arithmetic unit outputs to the circuit unit the voltage vector command for applying 2n kinds of voltage vectors with equal amplitudes and equal-interval phases to the nth phase winding over the same time period, and calculates and outputs magnetic-pole positions at every $60/(2^k)$ degrees (where k is a natural number) based on the current in the phases detected by the detecting unit.

2. The magnetic-pole position detecting apparatus for a synchronous motor according to claim 1, wherein the arithmetic unit outputs to the circuit unit the voltage vector command for applying the voltage vectors, over a time period sufficiently long for the nth phase winding to be magnetically saturated.

3. The magnetic-pole position detecting apparatus for a synchronous motor according to claim 1, wherein the arithmetic unit generates an added current value that is a result of an addition of currents for each combination of 180-degree different phases from among 2n current values that are in phase with the 2n voltage vectors, and calculates and outputs magnetic-pole positions at every $60/(2^k)$ degrees (where k is a natural number) based on the added current value.

4. The magnetic-pole position detecting apparatus for a synchronous motor according to claim 3, wherein the arithmetic unit outputs a magnetic-pole position corresponding to the added current value having a maximum absolute value.

5. The magnetic-pole position detecting apparatus for a synchronous motor according to claim 3, wherein the arithmetic unit outputs magnetic-pole positions corresponding to respective signs of the added current values.

6. The magnetic-pole position detecting apparatus for a synchronous motor according to claim 1, wherein the arithmetic unit generates a first added current value that is a result of an addition of currents for each combination of 180-degree different phases from among 2n current values that are in phase with the 2n voltage vectors, generates a second added current value that is a result of an addition of current values for each combination of every 180-degree different phases from among 2n current values that have components orthogonal with the 2n kinds of voltage vectors, and calculates and outputs magnetic-pole positions at every $60/(2^k)$ degrees (where k is a natural number) based on the first and second added current values.

7. The magnetic-pole position detecting apparatus for a synchronous motor according to claim 6, wherein the arithmetic unit selects a region of a magnetic-pole position corresponding to the first added current value having a maximum absolute value, and specifies a magnetic-pole position by further narrowing the region of the magnetic-pole position based on a large-and-small relationship that uses the second added current value within the selected region of the magnetic-pole position selected.

8. The magnetic-pole position detecting apparatus for a synchronous motor according to claim 6, wherein the arithmetic unit selects regions of magnetic-pole positions corresponding to respective signs of the first added current value, and specifies a magnetic-pole position by further narrowing each region of the magnetic-pole position based on a large-and-small relationship that uses the second added current value within the region of the magnetic-pole position selected.

9. The magnetic-pole position detecting apparatus for a synchronous motor according to claim 6, wherein the arithmetic unit selects a region of a magnetic-pole position corresponding to the first added current value having a maximum absolute value, specifies a magnetic-pole position by further narrowing the region of the magnetic-pole position based on a large-and-small relationship that uses the second added current value within the region of the magnetic-pole position selected, and further specifies a magnetic-pole position by further narrowing the region of the magnetic-pole position based on a new large-and-small relationship that uses the second added current value.

10. The magnetic-pole position detecting apparatus for a synchronous motor according to claim 6, wherein the arithmetic unit selects regions of magnetic-pole positions corresponding to respective signs of the first added current value, specifies a magnetic-pole position by further narrowing each region of the magnetic-pole position based on a large-and-small relationship that uses the second added current value within the region of the magnetic-pole position selected, and further specifies a magnetic-pole position by further narrowing the region of the magnetic-pole position based on a new large-and-small relationship that uses the second added current value.

11. The magnetic-pole position detecting apparatus for a synchronous motor according to claim 6, wherein the arithmetic unit generates a functional current value using a functional value that includes one of the first and second added current values, and specifies a region of the magnetic-pole position by further narrowing the region based on a large-and-small relationship between the functional current value and one of the first and second added current values.

12. The magnetic-pole position detecting apparatus for a synchronous motor according to claim 1, wherein the arithmetic unit generates a first added current value that is a result of an addition of current values for each combination of every 180-degree different phases from among 2n currents that are in phase with the 2n voltage vectors, generates a second added current value that is a result of an addition of current values for each combination of 180-degree different phases from among 2n current values that have components in phase with the 2n voltage vectors, and calculates and outputs magnetic-pole positions at every $60/(2^k)$ degrees (where k is a natural number) based on the first and second added current values.

13. The magnetic-pole position detecting apparatus for a synchronous motor according to claim 12, wherein the arithmetic unit selects a region of a magnetic-pole position corresponding to the first added current value having a maximum absolute value, and specifies a magnetic-pole position by further narrowing the region of the magnetic-pole position based on a large-and-small relationship that uses the second added current value within the region of the magnetic-pole position selected.

14. The magnetic-pole position detecting apparatus for a synchronous motor according to claim 12, wherein the arithmetic unit selects regions of magnetic-pole positions corresponding to respective signs of the first added current value, and specifies a magnetic-pole position by further narrowing each region of the magnetic-pole position based on a large-and-small relationship that uses the second added current value within the region of the magnetic-pole position selected.

15. The magnetic-pole position detecting apparatus for a synchronous motor according to claim 12, wherein the arithmetic unit selects a region of a magnetic-pole position corresponding to the first added current value having a maximum absolute value, specifies a magnetic-pole position by further narrowing the region of the magnetic-pole position based on a large-and-small relationship that uses the second added current value within the region of the magnetic-pole position selected, and further specifies a magnetic-pole position by further narrowing the region of the magnetic-pole position based on a new large-and-small relationship that uses the second added current value.

16. The magnetic-pole position detecting apparatus for a synchronous motor according to claim 12, wherein the arithmetic unit selects regions of magnetic-pole positions corresponding to respective signs of the first added current value, specifies a magnetic-pole position by further narrowing each region of the magnetic-pole position based on a large-and-small relationship that uses the second added current value within the region of the magnetic-pole position selected, and further specifies a magnetic-pole position by further narrowing the region of the magnetic-pole position based on a new large-and-small relationship that uses the second added current value.

17. The magnetic-pole position detecting apparatus for a synchronous motor according to claim 12, wherein the arithmetic unit generates a functional current value using a functional value that includes the first and second added current values, and specifies a region of the magnetic-pole position by further narrowing the region based on a large-and-small relationship between the functional current value and the one of first and second added current values.

18. The magnetic-pole position detecting apparatus for a synchronous motor according to claim 1, wherein the arithmetic unit calculates and outputs a magnetic-pole position by applying to the nth phase winding a voltage vector sufficiently larger than an induced voltage that is generated by rotation of the rotor of the synchronous motor, during the rotation of the rotor.

19. A magnetic-pole position detecting apparatus for detecting position of a rotor of a synchronous motor comprising:
a circuit unit which applies voltage vectors to an nth (where n is a natural number and at least 3) phase winding of a synchronous motor based on a voltage vector command;
a detecting unit which detects currents on the nth phase winding generated by voltage vectors applied from the circuit unit; and
an arithmetic unit which outputs the voltage vector command to the circuit unit, applies a trigger signal to the detecting unit immediately after an application of the voltage vectors based on the voltage vector command, so that the detecting unit detects currents on the nth phase winding, and calculates magnetic-pole positions of the synchronous motor based on the currents detected, and outputs the magnetic-pole positions calculated, wherein the arithmetic unit outputs to the circuit unit the voltage vector command for applying 2n kinds of voltage vectors to the nth phase winding over identical duration time periods in the order of either monotonically increasing or monotonically decreasing phases of the voltage vectors.

20. The magnetic-pole position detecting apparatus for a synchronous motor according to claim 19, wherein the arithmetic unit calculates and outputs a magnetic-pole position by applying to the nth phase winding a voltage vector sufficiently larger than an induced voltage that is generated by rotation of the rotor of the synchronous motor, during the rotation of the rotor.

* * * * *